US012793411B2

(12) United States Patent
Chiu et al.

(10) Patent No.: US 12,793,411 B2
(45) Date of Patent: Nov. 10, 2026

(54) AI-DRIVEN AUGMENTED REALITY MENTORING AND COLLABORATION

(71) Applicant: SRI International, Menlo Park, CA (US)

(72) Inventors: Han-Pang Chiu, West Windsor, NJ (US); Abhinav Rajvanshi, Plainsboro, NJ (US); Niluthpol C. Mithun, Lawrenceville, NJ (US); Zachary Seymour, Pennington, NJ (US); Supun Samarasekera, Skillman, NJ (US); Rakesh Kumar, West Windsor, NJ (US); Winter Joseph Guerra, New York, NY (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 18/370,357

(22) Filed: Sep. 19, 2023

(65) Prior Publication Data

US 2024/0096093 A1 Mar. 21, 2024

Related U.S. Application Data

(60) Provisional application No. 63/408,036, filed on Sep. 19, 2022.

(51) Int. Cl.
*G06V 20/20* (2022.01)
*G06T 7/30* (2017.01)
(Continued)

(52) U.S. Cl.
CPC ................ *G06V 20/20* (2022.01); *G06T 7/30* (2017.01); *G06T 7/50* (2017.01); *G06T 7/70* (2017.01);
(Continued)

(58) Field of Classification Search
None
See application file for complete search history.

(56) References Cited

U.S. PATENT DOCUMENTS

| | | | | |
|---|---|---|---|---|
| 10,403,045 | B2 * | 9/2019 | Corazza | G06T 15/60 |
| 11,544,910 | B2 * | 1/2023 | Croxford | G06V 10/56 |

(Continued)

OTHER PUBLICATIONS

Zhu, et al., "AR-Mentor: Augmented Reality Based Mentoring System", ISMAR 2014, 6 pages.

(Continued)

*Primary Examiner* — Andre L Matthews
(74) *Attorney, Agent, or Firm* — MOSER TABOADA

(57) ABSTRACT

A method for AI-driven augmented reality mentoring includes determining semantic features of objects in at least one captured scene, determining 3D positional information of the objects, combining information regarding the identified objects with respective 3D positional information to determine at least one intermediate representation, completing the determined intermediate representation using machine learning to include additional objects or positional information of the objects not identifiable from the at least one captured scene, determining at least one task to be performed and determining steps to be performed using a knowledge database, generating at least one visual representation relating to the determined steps for performing the at least one task, determining a correct position for displaying the at least one visual representation, and displaying the at least one visual representation on the see-through display in the determined correct position as an augmented overlay to the view of the at least one user.

20 Claims, 13 Drawing Sheets

(51) Int. Cl.

*G06T 7/50* (2017.01)
*G06T 7/70* (2017.01)
*G06T 19/00* (2011.01)
*G06V 20/40* (2022.01)
*G09B 5/02* (2006.01)
*G09B 19/00* (2006.01)

(52) U.S. Cl.

CPC .............. *G06T 19/00* (2013.01); *G06V 20/41* (2022.01); *G09B 5/02* (2013.01); *G09B 19/003* (2013.01); *G06T 2207/10016* (2013.01); *G06T 2210/61* (2013.01); *G06T 2219/024* (2013.01)

(56) References Cited

U.S. PATENT DOCUMENTS

2019/0304188 A1* 10/2019 Bridgeman .............. G09B 5/14
2019/0370587 A1* 12/2019 Burachas ................ G06T 11/60
2021/0012113 A1* 1/2021 Petill ...................... G06F 1/1694
2022/0215205 A1* 7/2022 Swaminathan ....... G06F 16/532
2023/0290266 A1* 9/2023 Jia .......................... H04L 65/612
2023/0410424 A1* 12/2023 Totty ......................... G06T 5/50
2024/0202876 A1* 6/2024 Shukla ................... G06V 10/82
2025/0046020 A1* 2/2025 Obstfeld ................ G06V 20/20

OTHER PUBLICATIONS

Garg, et al., "Unconditional Scene Graph Generation", Generation ICCV 2021, pp. 16362-16371.
Tahara, et al., "Retargetable AR: Context-aware Augmented Reality in Indoor Scenes based on 3D Scene Graph", ISMAR-Adjunct 2020, vol. 1, pp. 249-255.
Michieli, et al., "GMNet: Graph Matching Network for Large Scale Part Semantic Segmentation in the Wild", ECCV 2020, pp. 1-7.

* cited by examiner

AI-DRIVEN AUGMENTED REALITY MENTORING AND COLLABORATION

CROSS-REFERENCE TO RELATED APPLICATIONS

This application claims priority to and benefit of U.S. Provisional Patent Application Ser. No. 63/408,036 filed Sep. 19, 2022, which is herein incorporated by reference in its entirety.

BACKGROUND OF THE INVENTION

Field of the Invention

Embodiments of the present invention generally relate to augmented reality-assisted collaboration, and more specifically to AI-driven augmented reality-assisted mentoring and collaboration.

Description of the Related Art

Augmented reality (AR) is a real-time view of a physical, real-world environment whose elements are "augmented" by computer-generated sensory input such as sound, video, graphics and positioning data. A display of a real-world environment is enhanced by augmented data pertinent to a use of an augmented reality device. For example, mobile devices provide augmented reality applications allowing users to view their surrounding environment through the camera of the mobile device, while the mobile device determines the location of the device based on global positioning satellite (GPS) data, triangulation of the device location, or other positioning methods. These devices then overlay the camera view of the surrounding environment with location based data such as local shops, restaurants and move theaters as well as the distance to landmarks, cities and the like.

Current methods for AR systems require a great deal of manual effort. Most existing solutions cannot be used in new/unknown environments. These methods need to scan the environment with sensors (such as cameras) to capture objects of a scene that need to be identified by an expert such that a feature database can be constructed. In such current systems, a database needs to be manually annotated with the information about the location of different components of the environment. An AR provider then manually specifies a coordinate according to the landmark database of the target environment for inserting a virtual object/character inside the real scene for AR visualization. Such manual authoring could take several hours based on a number of objects/components in a scene. Further, in current systems an annotated database is only valid for a specific make and model.

SUMMARY OF THE INVENTION

Embodiments of the present principles provide methods, apparatuses and systems for AI-driven augmented reality-assisted mentoring and collaboration.

In some embodiments, a method for AI-driven augmented reality mentoring and collaboration includes determining semantic features of objects in at least one captured scene using a deep learning algorithm to identify the objects in the at least one scene, determining 3D positional information of the objects in the at least one captured scene, combining information regarding the identified objects of the at least one captured scene with respective 3D positional information to determine at least one intermediate representation of the at least one scene, which provides information regarding positions of the identified objects in the at least one captured scene and spatial relationships among the identified objects, completing the determined at least one intermediate representation using machine learning to include additional objects or positional information of the objects not identifiable from the at least one captured scene, determining at least one task to be performed and determining steps to be performed related to the identified at least one task using a knowledge database comprising data relating to respective steps to be performed for different tasks, generating at least one visual representation relating to the determined steps to be performed for the at least one task to assist the at least one user in performing the at least one task, determining a correct position for displaying the at least one visual representation on a see-through display as an augmented overlay to the view of the at least one user using information in the at least one completed intermediate representation, and displaying the at least one visual representation on the see-through display in the determined correct position as an augmented overlay to the view of the at least one user to guide the at least one user to perform the at least one task.

In some embodiments, the at least one user comprises two or more users and received and determined information is shared among the two or more users such that a correct position for displaying the at least one visual representation on a see-through display as an augmented overlay to the view of the two or more users is determined using information in at least one completed scene graph related to either one of the two or more users.

In some embodiments, 3D positional information of the objects is determined using at least one of data received from a sensor capable of capturing depth information of a scene or image-based methods, monocular image based depth estimation, multi-frame structure from motion imagery or 3d sensors.

In some embodiments, determining a correct position for displaying the at least one visual representation further includes determining an intermediate representation for the generated at least one visual representation which provides information regarding positions of objects in the at least one visual representation and spatial relationships among the objects, and comparing the determined intermediate representation of the generated at least one visual representation with the at least one intermediate representation of the at least one scene to determine how closely the objects of the visual representation align with the objects of the at least one scene.

In some embodiments, a task to be performed can be determined by generating a scene understanding of the at least one captured scene based on an automated analysis of the at least one captured scene, wherein the at least one captured scene comprises a view of a user during performance of a task related to the identified at least one object in the at least one captured scene.

In some embodiments, the intermediate representation comprises a scene graph.

In some embodiments, the method can further include analyzing actions of the user during the performance of a step of the task by using information related to a next step of the task, wherein, if the user has not completed the next step of the task, new visual representations are created to be generated and presented as an augmented overlay to guide the user to complete the performance of the next step of the task, and if the user has completed the next step of the task and a subsequent step of the task exists, new visual representations are created to be generated and presented as an overlay to guide the user to complete the performance of the subsequent step of the task.

In some embodiments, the at least one captured scene includes both video data and audio data, the video data comprising a view of the user of a real-world scene during performance of a task and the audio data comprising speech of the user during performance of the task, and wherein the steps relating to the performance of the task are further determined using at least one of the video data or the audio data.

In some embodiments, an apparatus for AI-driven augmented reality mentoring and collaboration includes a processor, and a memory accessible to the processor, the memory having stored therein at least one of programs or instructions. In some embodiments, upon execution of the at least one of programs or instructions by the processor, the apparatus is configured to determine semantic features of objects in at least one captured scene using a deep learning algorithm to identify the objects in the at least one scene, determine 3D positional information of the objects in the at least one captured scene, combine information regarding the identified objects of the at least one captured scene with respective 3D positional information to determine at least one intermediate representation of the at least one scene, which provides information regarding positions of the identified objects in the at least one captured scene and spatial relationships among the identified objects, complete the determined at least one intermediate representation using machine learning to include additional objects or positional information of the objects not identifiable from the at least one captured scene, determine at least one task to be performed and determining steps to be performed related to the identified at least one task using a knowledge database comprising data relating to respective steps to be performed for different tasks, generate at least one visual representation relating to the determined steps to be performed for the at least one task to assist the at least one user in performing the at least one task, determine a correct position for displaying the at least one visual representation on a see-through display as an augmented overlay to the view of the at least one user using information in the at least one completed intermediate representation, and display the at least one visual representation on the see-through display in the determined correct position as an augmented overlay to the view of the at least one user to guide the at least one user to perform the at least one task.

In some embodiments a non-transitory computer readable storage medium has stored thereon instructions that when executed by a processor perform a method for AI-driven augmented reality mentoring and collaboration, the method including determining semantic features of objects in at least one captured scene using a deep learning algorithm to identify the objects in the at least one scene, determining 3D positional information of the objects in the at least one captured scene, combining information regarding the identified objects of the at least one captured scene with respective 3D positional information to determine at least one intermediate representation of the at least one scene, which provides information regarding positions of the identified objects in the at least one captured scene and spatial relationships among the identified objects, completing the determined at least one intermediate representation using machine learning to include additional objects or positional information of the objects not identifiable from the at least one captured scene, determining at least one task to be performed and determining steps to be performed related to the identified at least one task using a knowledge database comprising data relating to respective steps to be performed for different tasks, generating at least one visual representation relating to the determined steps to be performed for the at least one task to assist the at least one user in performing the at least one task, determining a correct position for displaying the at least one visual representation on a see-through display as an augmented overlay to the view of the at least one user using information in the at least one completed intermediate representation, and displaying the at least one visual representation on the see-through display in the determined correct position as an augmented overlay to the view of the at least one user to guide the at least one user to perform the at least one task.

In some embodiments a method for AI-driven augmented reality mentoring and collaboration for two or more users includes determining semantic features of objects in at least one captured scene associated with two or more users using a deep learning algorithm to identify the objects in the at least one captured scene, determining 3D positional information of the objects in the at least one captured scene, combining information regarding the identified objects of the at least one captured scene with respective 3D positional information of the objects to determine at least one intermediate representation of the at least one scene, which provides information regarding positions of the identified objects in the at least one captured scene and spatial relationships among the identified objects, completing the determined at least one intermediate representation using machine learning to include at least additional objects or additional positional information of the objects not identifiable from the at least one captured scene, determining at least one task to be performed and determining steps to be performed related to the identified at least one task using a knowledge database comprising data relating to respective steps to be performed for different tasks, generating at least one visual representation relating to the determined steps to be performed for the at least one task to assist the at least one user in performing the at least one task, determining a correct position for displaying the at least one visual representation on a respective see-through display of the two or more users as an augmented overlay to the view of the two or more users using information in the at least one completed intermediate representation, and displaying the at least one visual representation on the respective see-through displays in the determined correct position as an augmented overlay to the view of the two or more users to guide the two or more users to perform the at least one task, individually or in tandem.

Various advantages, aspects and features of the present disclosure, as well as details of an illustrated embodiment thereof, are more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
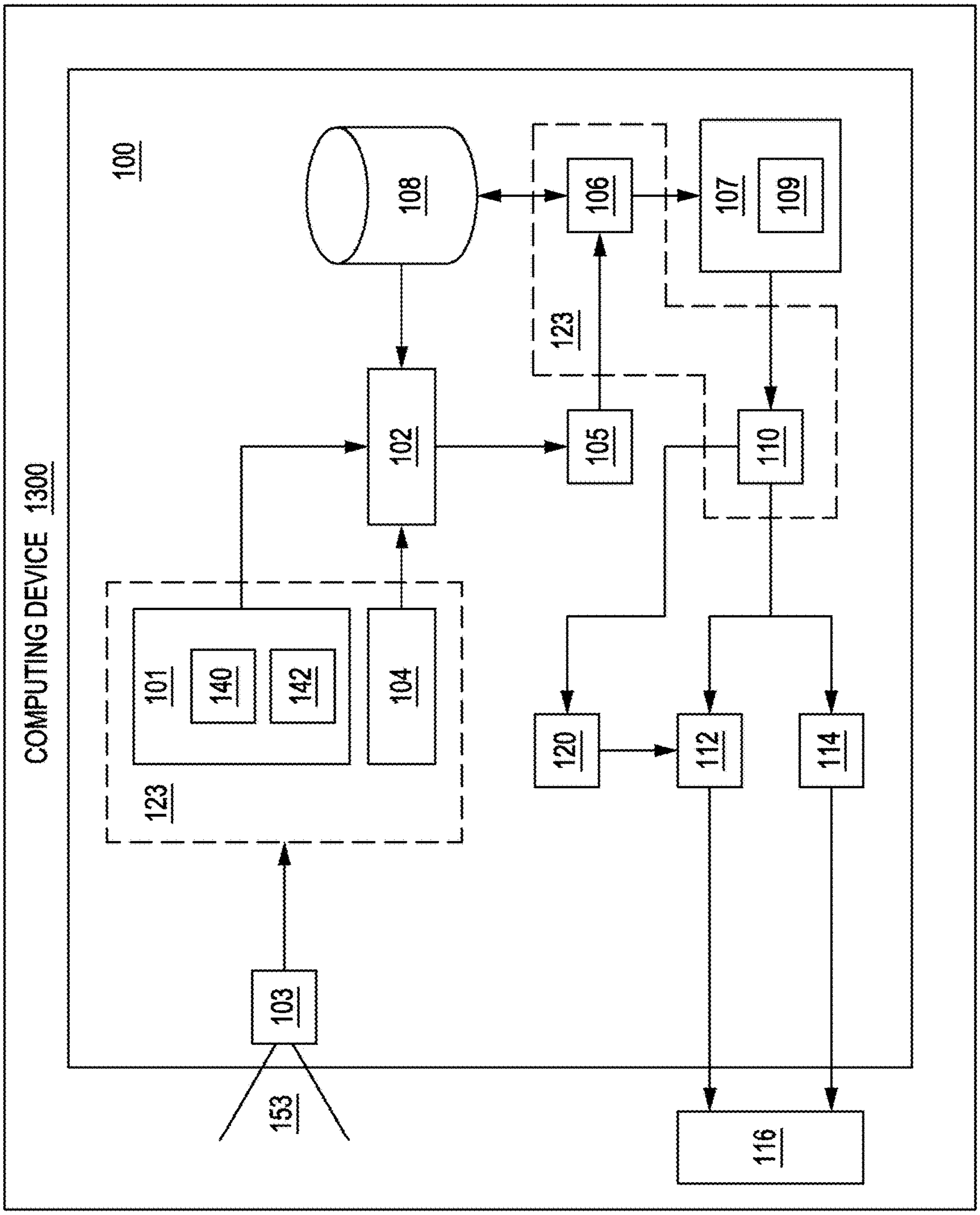
FIG. 1 depicts a high-level block diagram of an AI-driven AR mentoring and collaboration system in accordance with an embodiment of the present principles.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present principles generally relate to artificial intelligence (AI)-driven augmented reality (AR) mentoring and collaboration. While the concepts of the present principles are susceptible to various modifications and alternative forms, specific embodiments thereof are shown by way of example in the drawings and are described in detail below. It should be understood that there is no intent to limit the concepts of the present principles to the particular forms disclosed. On the contrary, the intent is to cover all modifications, equivalents, and alternatives consistent with the present principles and the appended claims. For example, although embodiments of the present principles will be described primarily with respect to specific collaborations, such as the maintenance and repair of automobiles, embodiments of the present principles can be applied to the mentoring of and collaboration with users via an AI-driven, AR-assisted method, system and apparatus for the completion of substantially any task.

Embodiments of the present principles can automatically insert visual objects/characters in a scene based on scene contexts with known relationships among objects in, for example, a new/unknown environment. In some embodiments, the process becomes automatic based on prior knowledge/rules/instructions, such as inserting humans on real chairs. In some embodiments, the scene contexts can be automatically analyzed based on semantic scene graph technologies. No manual effort to build a database is needed beforehand, The guidance/instructions/training provided by embodiments of the present principles can be related to any kind of task, for instance, using a device, or repairing machines or performing a certain task in a given environment. For example, embodiments of the present principles can provide operational guidance and training for augmented reality collaboration including the maintenance and repair of devices and systems, such as automobiles, to a user via two modes of support: (1) Visual Support-Augmented Reality (AR)-assisted graphical instructions on User's display, and (2) Audio Support-Virtual Personal Assistant (VPA), verbal instructions. In some embodiments of the present principles, a machine learning (ML) network (e.g., CNN-based ML network) is implemented for semantic segmentation of objects in a captured scene and for learning a scenegraph representation of components of the scene to guide the learning process towards accurate relative localization of semantic objects/components. Alternatively or in addition, in some embodiments of the present principles, efficient training of scene models can also be accomplished using determined Scene Graphs.

In accordance with the present principles, each of the objects of a scene captured by at least one sensor can be identified by a scene module of the present principles (described below). Advantageously, an AI-driven AR mentoring and collaboration system of the present principles, such as the AI-driven AR mentoring and collaboration system 100 of FIG. 1, can capture and determine a complete picture of a subject location, equipment, machine, vehicle, and the like to be able to correctly assist a user to, for example, identify, work-on and/or repair the subject location, equipment, machine, vehicle, and the like. In contrast, in other AR-assisted systems, a location, equipment, machine, vehicle, and the like are identified by the recognition of one or two objects/parts of a scene and comparing the recognized objects/parts with objects/parts stored in a knowledge base that are components of a complete system. If a match is found, the recognized objects/parts are assumed to be a part of the complete system that matched. As such, in such AR-assisted systems, any assistance to a user is based on giving repair advice for the identified system and other parts included in an identified system. However, in such AR-assisted systems, if there is no system match for the recognized objects/parts, the AR-assisted system cannot provide assistance to a user. In addition, if a modification (e.g., after market parts added to an automobile) has been made to a location, equipment, machine, vehicle, and the like, the identified system match will not provide an accurate representation of the location, equipment, machine, vehicle, and the like and as such, cannot provide accurate assistance to a user.

FIG. 1 depicts a high-level block diagram of an AI-driven AR mentoring and collaboration system 100 in accordance with an embodiment of the present principles. The AI-driven AR mentoring and collaboration system 100 of FIG. 1 illustratively comprises at least one sensor 103 providing at least a video feed, and in some embodiments an audio feed, of a scene 153 in which a user of the AI-driven AR mentoring and collaboration system 100 is performing a task. The AI-driven AR mentoring and collaboration system 100 of FIG. 1 illustratively further comprises a scene module 101, a correlation module 102, a language module 104, a task mission understanding module 106, a knowledge database 108, a reasoning module 110, an augmented reality generator 112, a speech generator 114 and an optional performance module 120. In some embodiments, and as depicted in the embodiment of FIG. 1, the scene module 101, the language module 104, the task mission understanding module 106, and the reasoning module 110 can comprise an understanding module 123. Although in the embodiment of FIG. 1, the at least one sensor 103 is depicted as a single sensor for ease of description, in alternate embodiments, an AI-driven AR mentoring and collaboration system of the present principles can comprise two or more sensors 103 for capturing at least video and audio data. As depicted in FIG. 1, embodiments of an AI-driven AR mentoring and collaboration system of the present principles, such as the AI-driven AR mentoring and collaboration system 100 of FIG. 1, can be implemented via a computing device 1300 in accordance with the present principles (described in greater detail below with respect to FIG. 13).

In the embodiment of the AI-driven AR mentoring and collaboration system 100 of FIG. 1, the at least one sensor is coupled to the scene module 101 and the language module 104. As described above, in some embodiments, at least one of the at least one sensors 103 is a video sensor coupled to the scene module 101 and at least one of the at least one sensors 103 can include an audio sensor coupled to the language module 104. In the embodiment of FIG. 1, the AI-driven AR mentoring and collaboration system 100 is further communicatively coupled to output devices 116. According to some embodiments, the output devices 116 comprise at least audio and video output devices such as speakers and a display. According to some embodiments, an output display is coupled with input video sensors and an output audio device is coupled with input audio sensors.

In the embodiment of the AI-driven AR mentoring and collaboration system 100 of FIG. 1, the scene module 101 analyzes the video feed to identify all of the objects in the scene 153 such as equipment, machine parts, vehicles, locations, and the like. For example and as depicted in the embodiment of the AI-driven AR mentoring and collaboration system 100 of FIG. 1, the scene module 101 can include a semantic segmentation module 140 and a scene graph module 142. The semantic segmentation module 140 can partition received images into multiple image segments, image regions or image objects. In some embodiment of the present principles, the semantic segmentation module 140 can implement a deep learning algorithm that associates a label or category with every pixel in an image to recognize a collection of pixels that form distinct categories. For example and as depicted in the AI-driven AR mentoring and collaboration system 100 of FIG. 1, the scene module 101 comprises a machine learning system 141 that can be used by the semantic segmentation module 140 to associate a label or category with every pixel in an image to recognize a collection of pixels that form distinct categories to semantically segment objects of the scene 153. That is, the scene module 101 can determine semantic features of a collection of pixels. The collection of pixels can then be identified and labeled as a specific object in the scene 153. That is, in the embodiment of FIG. 1, the machine learning system 141 can be trained to label groups of pixels in the scene 153 as specific objects.

In some embodiments of the present principles, a machine learning system of the present principles, such as the machine learning system 141 of the scene module 101 of the AI-driven AR mentoring and collaboration system 100 of FIG. 1, can include a multi-layer neural network comprising nodes that are trained to have specific weights and biases. In some embodiments, the machine learning system 141 employs artificial intelligence techniques or machine learning techniques to analyze received scene data to identify objects of the received scene data. In some embodiments in accordance with the present principles, suitable machine learning techniques can be applied to learn commonalities in sequential application programs and for determining from the machine learning techniques at what level sequential application programs can be canonicalized. In some embodiments, machine learning techniques that can be applied to learn commonalities in sequential application programs can include, but are not limited to, regression methods, ensemble methods, or neural networks and deep learning such as 'Seq2Seq' Recurrent Neural Network (RNNs)/Long Short-Term Memory (LSTM) networks, Convolution Neural Networks (CNNs), graph neural networks applied to the abstract syntax trees corresponding to the sequential program application, and the like. In some embodiments a supervised machine learning (ML) classifier/algorithm could be used such as, but not limited to, Multilayer Perceptron, Random Forest, Naive Bayes, Support Vector Machine, Logistic Regression and the like. In addition, in some embodiments, the ML classifier/algorithm of the present principles can implement at least one of a sliding window or sequence-based techniques to analyze data content.

The machine learning system 141 of the scene module 101 of the AI-driven AR mentoring and collaboration system 100 of FIG. 1 can be trained using a plurality (e.g., hundreds, thousands, millions, etc.) of instances of labeled scene data (e.g., pixels) in which the training data comprises a plurality of labeled data to train a machine learning system of the present principles to recognize/identify and label objects in received scene data using, for example, semantic segmentation.

In accordance with the present principles, depth information of a captured scene is determined. In some embodiments of the AI-driven AR mentoring and collaboration system of the present principles, such as the AI-driven AR mentoring and collaboration system 100 of FIG. 1, one of the at least one sensors 103 can include a sensor capable of providing depth information for captured images. For example, in some embodiments a Lidar sensor can provide depth information of a scene by capturing a depth image.

Alternatively or in addition, in some embodiments of the present principles, depth information of a scene (e.g., scene 153) can be determined using image-based methods such as monocular image-based methods including depth estimation of images, multi-frame structure from motion imagery and depth, and/or other 3d sensors. The depth information can be used by the scene module 101 to determine a point cloud of a captured scene.

In accordance with the present principles, the scene graph module 142 can use the semantic features determined by the semantic segmentation module 140 and the depth information, such as 3D object position information of for example a determined point cloud, to determine a scene graph representation of captured scenes, which include node and edge level features of the objects in the scene. That is, in some embodiments the scene graph module 142 can determine a scene graph of each captured scene.

Scene graph representations serve as a powerful way of representing image content in a simple graph structure. A scene graph consists of a heterogeneous graph in which the nodes represent objects or regions in an image and the edges represent relationships between those objects. A determined scene graph of the present principles provides both the dimensions of each object, as well as the location of the object including spatial relationship to other identified objects represented in the scene graph. More specifically, in embodiments of the present principles, the scene graph module 142 of the scene module 101 combines information of the determined semantic features of the scene with respective 3D positional information (e.g., point cloud(s)), for example, using a machine learning system (e.g., in some embodiments, neural networks) to determine a representation of the scene which provides information regarding positions of the identified objects in the scene and spatial relationships among the identified objects. An embodiment of such a process is described in commonly owned, pending U.S. patent application Ser. No. 17/554,661, filed Dec. 17, 2021, which is herein incorporated by reference in its entirety. For example, in some embodiments the machine learning system 141 of the scene module 101 can be implemented to determine a representation of the scene which provides information regarding positions of the identified objects in the scene and spatial relationships among the identified objects as described in pending U.S. patent application Ser. No. 17/554,661.

Figure 2:
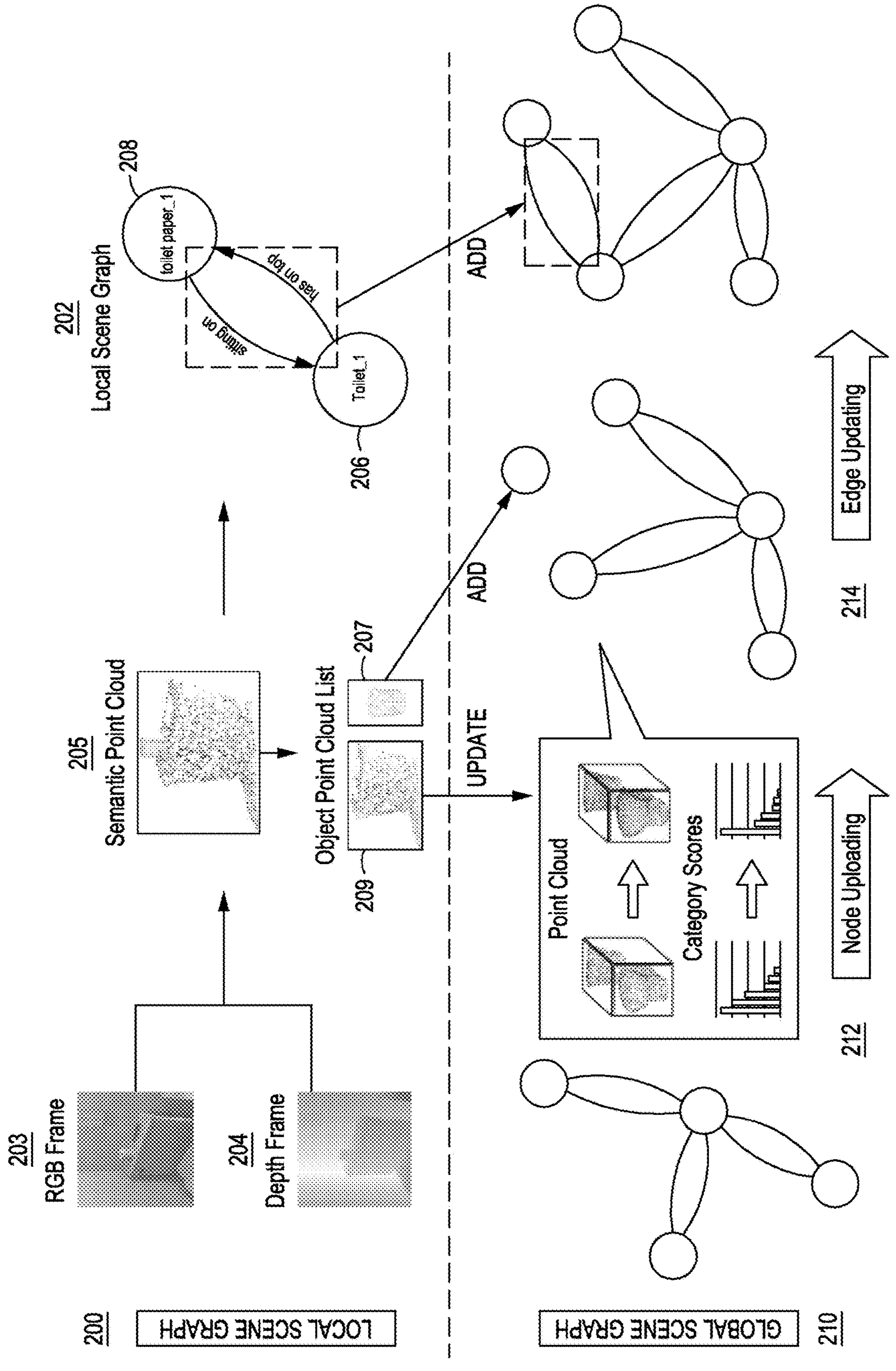
FIG. 2 depicts a graphic representation of the determination of scene graphs of captured scenes by a scene graph module of the present principles, in accordance with an embodiment of the present principles.

For example, FIG. 2 depicts a graphic representation of the determination of scene graphs of captured scenes by a scene graph module of the present principles, such as the scene graph module 142 of the scene module 101 of the AR mentoring and collaboration system 100 of FIG. 1, in accordance with an embodiment of the present principles. In the embodiment of FIG. 2, for a local scene graph 202, a captured image frame 203 (illustratively an RGB frame) of a scene is combined with a depth frame 204 (e.g., depth information of a captured depth image) of the scene to determine a semantic point cloud 205 of the local scene graph 202. The semantic point cloud 205 can be separated into an object point cloud list 207 including identified objects and a point cloud 209 identifying the spatial relationships of the identified objects. In the embodiment of FIG. 2, a spatial relationship between a first identified object 206, a toilet, and a second identified object 208, toilet paper, in the local scene, as determined using the local scene graph 202, is shown. In the embodiment of FIG. 2 the relationship between the toilet 206 and the toilet paper 208 is defined as a two-way relationship in which a position of the toilet paper 208 is defined as being on top of the toilet 206 and a status of the toilet 206 is defined as having the toilet paper 208 positioned on top.

As further depicted in the embodiment of FIG. 2, the local scene graph 202 of a captured scene can be combined with other determined scene graphs of, for example, other captured scenes to establish a global environment of scene graphs for captured scenes. That is, in the embodiment of FIG. 2, the information in the local scene graph 202 is combined with information of a global scene graph 210 to update the global scene graph information with information of a local scene graph 202. For example, as depicted in the embodiment of FIG. 2, information from the local scene graph 202 is used to update the node information 212 and the edge information 214 of the global scene graph 210. Using the determined scene graph in accordance with the present principles, the scene module 101 can locate and identify objects in captured scenes, such as equipment, machine parts, vehicles, locations, and the like, and can determine the orientation of the objects in relation to each other and in the global scene environment as a whole.

In some embodiments of the present principles, the identity and location of all of the objects/components identified by the scene module 101 can be used to identify a device or system (i.e., automobile), which the objects/components comprise and/or can be used to determine how to perform actions/repairs on the identified objects/components and/or an identified device. For example, in some embodiments the identity and location of all of the identified objects/components can be compared with components and locations of previously known devices and systems, which in some embodiments can be stored in a storage device, such as the knowledge database 108 of FIG. 1, that is accessible to at least the scene module 101, to identify a device and/or system in the scene 153. That is, if the type and location of all of the objects/components identified by the scene module 101 align with the type and location of the object/components of a known device and/or system, the device and/or system in the scene 153 can be considered to be identified. Based on identified objects/components and/or a device, the knowledge base 108 can be searched to find stored instructions (e.g., procedures) for, for example, responding to a user request (described in greater detail below). In some embodiments of the present principles, the knowledge database can be included in a memory of a computing device of the preset principles (described in greater detail with respect to FIG. 11).

In some embodiments of the present principles, if the type and location of all of the objects/components identified by the scene module 101 do not align with the type and location of the object/components of any known device and/or system stored in the knowledge base 108, an AR mentoring and collaboration system of the present principles, such as the AR mentoring and collaboration system 100 of FIG. 1, can provide assistance to a user based on the identified type and location of the individual components. That is, once an object/component in a scene 153 is identified and located by a scene module of the present principles, such as the scene module 101 of FIG. 1, an AR mentoring and collaboration system of the present principles, such as the AR mentoring and collaboration system 100 of FIG. 1, can provide assistance to a user based on, for example, a known functionality of the individual objects/components, which can be stored in the knowledge base 108.

For example, an AR mentoring and collaboration system of the present principles, such as the AR mentoring and collaboration system 100 of FIG. 1, can receive from a user a request for assistance on cooking a specific dish. The AR mentoring and collaboration system of the present principles can capture an image of the user's environment (e.g., a kitchen) and generate a scene graph to identify the objects in the kitchen, such as a countertop, a stove, a refrigerator, etc., in accordance with the present principles.

In some embodiments, a task to be performed can be determined from the user request or any other language captured from the scene 153. For example, in some embodiments, the language module 104 of the understanding module 123 of the AR mentoring and collaboration system 100 of FIG. 1 can perform natural language processing on received audio data, such as the user request/question, to determine a task to be performed. For instance, in the example above, the language module can determine that the user wants information/assistance with cooking a specific dish. The language module 104 can include a real-time dialog and reasoning system that supports human-like interaction using spoken natural language. The language module 104 can be based on automated speech recognition, natural language understanding, and reasoning and the like. Alternatively or in addition, in some embodiments a user can communicate a collaboration request in a visual message. In such embodiments, a task can be determined from the visual collaboration request by parsing the visual message and determining from the visual message a task included in a received collaboration request. In such embodiments, such parsing of the visual message task can be performed by any of the components of the understanding module 123 of the AR mentoring and collaboration system 100 of FIG. 1, including but not limited to the task mission understanding module 106, the scene module 102 and/or the language module 104. In such embodiments, such components would communicate with the database 108 via a connection between the understanding module 123 and the database 108.

Alternatively or in addition, in some embodiments of the present principles, a task to be performed can be determined automatically using captured scene data, which is described in greater detail below with respect to a description of the determination of user intent in accordance with an embodiment of the present principles.

Once a task to be performed has been determined/identified in accordance with the various embodiments of the present principles described herein, a database can be searched to determine if instructions/steps exist for performing the identified task. For example, in some embodiments, the task mission understanding module 106 of the understanding module 123 of the AR mentoring and collaboration system 100 of FIG. 1 can search the database 108 for stored information/steps for performing the determined/identified task. For instance, in the cooking example described above, the task mission understanding module 106 of the understanding module 123 of the AR mentoring and collaboration system 100 of FIG. 1 can search the database 108 for stored information/steps for cooking the specific dish and, in some embodiments, can search the database 108 for stored information/steps for cooking the specific dish in the kitchen environment identified by the generated scene graph.

In some embodiments of the present principles, the reasoning module 110 receives relative task information and determines which task or step(s) of a task has priority in completion and reasons a next step based on the priority. The output from the reasoning module 110 can be input to the augmented reality generator 112 and, in some embodiments (further described below) the speech generator 114. The AR generator 112 creates display content that takes into account at least one scene graph determined for a captured scene (e.g., the scene 153) and or a global scene graph and, in some embodiments, a user perspective (as described below). The AR generator 112 can update a display the user sees in real-time as the user performs tasks, completes tasks, steps, and moves on to different tasks, and transitions from one environment to the next.

In accordance with the present principles, the AR mentoring and collaboration system of the present principles can assist the user in, for example, cooking the specific dish in the identified environment. For example, the AR mentoring and collaboration system of the present principles can generate an AR image of the ingredients of the specific dish on the identified countertop. The AR mentoring and collaboration system of the present principles can then generate an AR image of a specific ingredient on a cutting board on the countertop and also generate an AR image of a knife chopping the ingredient if required. The AR mentoring and collaboration system of the present principles can further generate an image of a boiling pot of water on the identified stove and an AR image of a placement of at least one of the ingredients into the boiling pot of water, and so on. That is, the AR mentoring and collaboration system of the present principles can generate AR images to instruct the user on how to cook the specific dish according to the retrieved task steps/instructions.

In some embodiments of the present principles, an AR mentoring and collaboration system of the present principles, such as the AR mentoring and collaboration system 100 of FIG. 1, can provide a scene graph completion process. That is, in some embodiments of the present principles, the machine learning system 141 of the scene module 101 can be trained to complete scene graphs determined from captured scenes in accordance with the present principles by using object and position information from other scene graphs, for example, stored in the database 108. For example, in some embodiments, the machine learning system 141 of the scene module 101 can be trained using a plurality (e.g., hundreds, thousands, millions, etc.) of instances of scene graphs data to train a machine learning system of the present principles to recognize/identify relationships between nodes (objects) and edges (spatial relationship between objects). For example, in some embodiments, the nodes and edges of a subject scene graph determined in accordance with the present principles for a captured scene can be used by a machine learning system of the present principles, such as the machine learning system 141 of the scene module 101 of the AR mentoring and collaboration system 100 of FIG. 1, to identify additional node and edge information for the subject scene graph using additional scene graphs, that in some embodiments can be the scene graphs used to train the machine learning system 141, and that can be stored, for example, in the database 108.

Figure 3A:
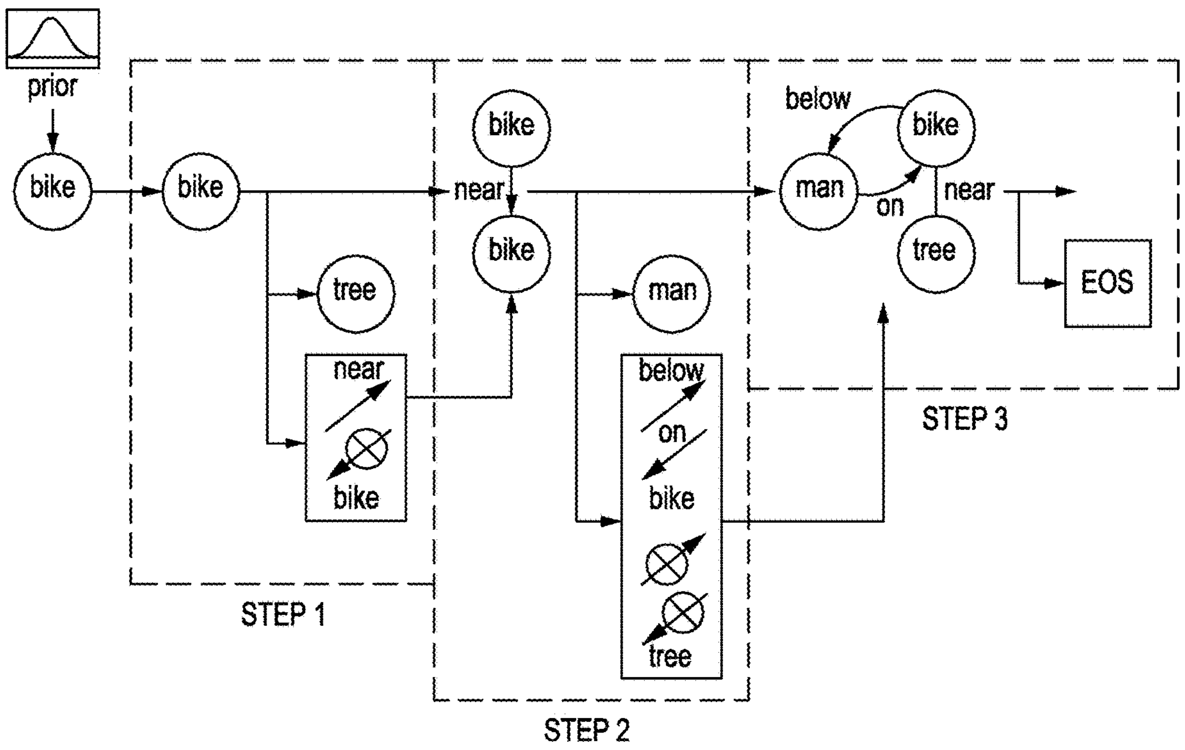
FIG. 3A depicts a graphic representation of a completion process in accordance with an embodiment of the present principles.

For example, FIG. 3A depicts a graphic representation of a completion process in accordance with an embodiment of the present principles. In the embodiment of FIG. 3A, a node/object (a bike) is selected from a previously determined scene graph that was determined for a captured scene in accordance with the present principles. In a first step, the bike can then be searched for by, for example, the trained machine learning system 141 of the scene module 101, in other stored scene graphs (or by using a model determined by the machine learning system 141) to determine nodes in other scene graphs proximate to the bike and spatial relationships of the other nodes to the bike in the other scene graphs. For example, in the embodiment of FIG. 3A, in the first step, it is determined that a bike is near a tree in at least one other stored scene graph. In a second step of the embodiment of FIG. 3A, a relationship of a man to the bike and the tree is determined. That is, in some embodiments, the machine learning system 141 can determine using, for example, stored scene graphs, that a man can have a spatial relationship to a bike and a tree, although such relationship was not obvious or determinable from the scene graph generated for a captured scene, such as scene 153. Using the historical data (e.g., stored scene graphs) in the third step, a relationship between the man, the tree, and the bike is determined and a scene graph can be created. The process can then end. Such process is considered by the inventors as "completing" the scene graph.

Figure 3B:
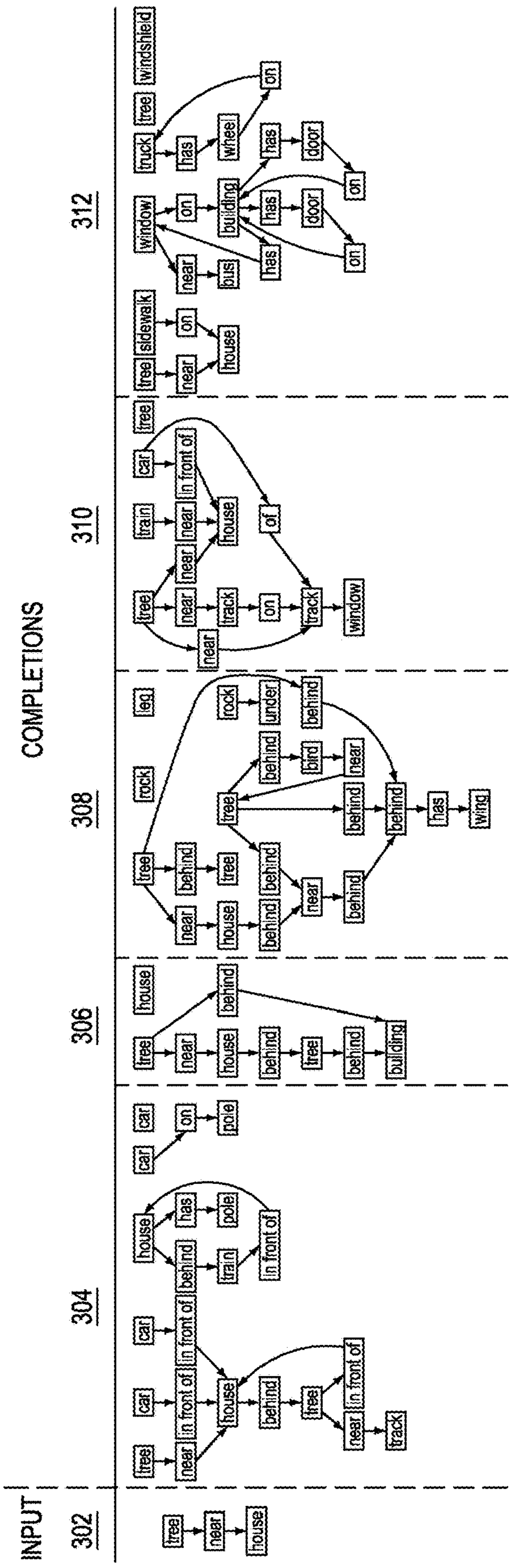
FIG. 3B depicts an alternate graphic representation of an embodiment of the scene graph completion process in accordance with an embodiment of the present principles.

For further explanation, FIG. 3B depicts an alternate graphic representation of an embodiment of the scene graph completion process in accordance with an embodiment of the present principles. In the embodiment of FIG. 3B, the input scene graph 302 comprises a scene graph determined in accordance with the present principles from a captured scene. The input scene graph 302 in the embodiment of FIG. 3B has been evaluated and two nodes and their spatial relationship to each other has been determined by, for example the machine learning system 141 of the scene module 101. In the embodiment of FIG. 3B, five steps 304-312 of a scene graph completion process of the present principles have been applied to the input scene graph 302. As depicted in the embodiment of FIG. 3B, the five completion steps 304-312 determine additional data (e.g., nodes and edges) that can be associated with the input scene graph to, for example, provide additional data for providing AR collaboration and mentoring for a user of an AR mentoring and collaboration system of the present principles, such as the AR mentoring and collaboration system 100 of FIG. 1.

As depicted in the embodiment of FIG. 3B, the matched, first completion scene graph 304 provides information regarding a position of a car, a track, a train, and a pole relative to the house and the tree in the input scene graph 302 of the captured scene, and relative to each other. As such, if subsequently, an AR mentoring and collaboration system of the present principles, such as the AR mentoring and collaboration system 100 of FIG. 1, needs to assist a user with a task that requires information regarding a location of the train, although the captured scene does not contain an image of the train, information provided by the first step of the completion process and in the scene graph 304 can be used by the AR mentoring and collaboration system 100 to provide determined AR content relative to where the train might exist in the captured scene and the determined scene graph 302, based on information provided by the completion scene graph 304.

Similarly, in the embodiment of FIG. 3B, the second 306, the third 308, the fourth 310 and the fifth 312 completion scene graphs provide additional information regarding objects and spatial positioning of object that can exist in a scene relative to the tree and the house of the captured scene and the determined scene graph 302. For example, in the embodiment of FIG. 3B, the second completion scene graph 306 provides information regarding a position of a house and a tree relative to a building; the third completion scene graph 308 provides information regarding a position of a house and a tree relative to a rock, a building, a hill, a bird, a leg of the bird and a wing of the bird, and positioning information relative to each other; the fourth completion scene graph 310 provides information regarding a position of a house and a tree relative to a train, a track, a car, and a window, and positioning information relative to each other; and the fifth completion scene graph 312 provides information regarding a position of a house and a tree relative to a sidewalk, a building, a bus, a truck, a windshield, a wheel, and a door, and positioning information relative to each other. As described above, the additional information provided by a completion scene graph can be used to determine where in a scene AR data should be provided in accordance with the present principles. For example, in the cooking request previously described, if a scene graph captured by a user does not show a cutting board, a matched scene graph that does show a cutting board can assist an AR mentoring and collaboration system of the present principles, such as the AR mentoring and collaboration system 100 of FIG. 1, can determine where an AR image of a cutting board should be placed in the kitchen environment captured by the user using, for example, the at least one sensor 103.

In summary, scene graphs determined for captured scenes in accordance with the present principles can be completed, as described above using a machine learning process of the machine learning system 141 to include additional objects or positional information of the objects not identifiable from the at least one captured scene. Information from scene graphs completed in accordance with the present principles can be used to determine a correct position for displaying determined AR content on a see-through display as an augmented overlay to the view of at least one user. That is, if the original scene graph determined for captured scene content does not include an object near/on which AR content is to be displayed, completing the scene graph in accordance with the present principles can provide additional object and/or positioning information of objects not determinable/identifiable from the original scene graph to be able to more accurately determine a correct position for displaying determined AR content on a see-through display as an augmented overlay to the view of at least one user. That is, in some embodiments of the present principles, a correct position for displaying determined AR content can be determined by generating a scene graph for the AR content, which provides information regarding positions of objects in AR content and spatial relationships among the objects and comparing the determined scene graph of the AR content with the scene graph of a captured scene to determine how closely the objects of the visual representation align with the objects of the at least one scene.

In some embodiments of the present principles, an AR mentoring and collaboration system of the present principles, such as the AR mentoring and collaboration system 100 of FIG. 1, can support multiple user AR mentoring and collaboration. That is, in some embodiments support for multiple, concurrent users of an AR mentoring and collaboration system of the present principles is provided. In such embodiments, video and audio data captured or received by an AR mentoring and collaboration system of the present principles can be shared by multiple users. In such embodiments, multiple users can log onto an AR mentoring API using, for example, the computing device 1300. In such embodiments, the users can log into the API to begin a collaborative session. Any data received or determined by an AR mentoring and collaboration system of the present principles, such as the AR mentoring and collaboration system 100 of FIG. 1, can then be shared amongst the multiple users. In such embodiments, when a collaboration request is made by any of the users, an AR mentoring and collaboration system of the present principles, such as the AR mentoring and collaboration system 100 of FIG. 1, can determine a task in accordance with the present principles and using any of the methods described herein and, in some embodiments, using the components of the task understanding module 123, as described above. Such determined task information is shared amongst the multiple users. In such embodiments, when a step of a task is performed, each of the users can be informed of the completed task either on a respective display of each user or using a common display.

In accordance with the present principles and as described above, once a task is determined, steps for performing the task can be identified using information stored in the database 180. As further described above, the reasoning module 110 can receive relative task information and determine which task or step(s) of a task has priority in completion and reasons a next step based on the priority. The output from the reasoning module 110 can be input to the augmented reality generator 112 and, in some embodiments (further described below) the speech generator 114. The AR generator 112 creates AR display content that takes into account at least one scene graph determined for a captured scene (e.g., the scene 153) and or a global scene graph and, in some embodiments, a user perspective (as described below). The AR generator 112 can update a display the user sees in real-time as the user performs tasks, completes tasks, steps, and moves on to different tasks, and transitions from one environment to the next.

In some embodiments of the present principles, the AR generator 112 can implement a matching process to determine/verify a correct position for displaying the at least one visual representation on a see-through display as an augmented overlay to the view of the two or multiple users. That is, in some embodiments, a scene graph can be determined for AR content generated by the AR generator 112 in accordance with the present principles. In such embodiments, the AR scene graph can be determined and compared by the AR generator 112 (or alternatively by the scene module 101) to a scene graph determined for a captured scene, such as the scene 153. The determined AR content can then be adjusted based on how closely the AR scene graph matches the scene graph determined for a captured scene in which the AR content is to be displayed. For example, if determined AR content includes a man to be inserted on a chair near a tv and a table, and a remote to be placed on the table, an AR scene graph of the man and the remote can be compared to a scene graph of the chair, the tv, and the table to determine how closely the AR man and remote align with the scene graph of the chair, the tv, and the table. In some embodiments, a similarity score can be determined from the comparison and a threshold can be established such that a result of a comparison wherein AR content having a similarity score over the threshold can be displayed on the scene and AR content having a similarity score below the threshold will not be displayed on the scene (or vice versa).

With respect back to FIG. 1 and in further detail of, for example, an alternate embodiment of determining a task, in some embodiments of the present principles, the scene module 101 extracts visual cues from the video image data to situate the user with respect to the world, including any equipment on which the user is being trained. The relative position and head orientation of the user can be tracked continually by the at least one sensor 103. The visual cues and observed scene characteristics are used by the scene module 101 to understand user action and intents.

The language module 104 performs natural language processing on the received audio feed, augmenting the scene understanding generated by the scene module 101. The language module 104 can include a real-time dialog and reasoning system that supports human-like interaction using spoken natural language. The language module 104 can be based on automated speech recognition, natural language understanding, and reasoning. The language module 104 recognizes the user's goals and provides feedback through the speech generator 114, discussed below. The feedback and interaction with a user can occur both audibly and by causing the AI-driven AR mentoring and collaboration system 100 to display icons and text visually on a user's display.

The function of the understanding module 123 of FIG. 1 (collectively the scene module 101 and the language module 104) implements low-level sensor data (audio and visual) to determine intent (or user state 105) of a user in the context of determined workflow for performing a complex task. As the user performs a task and progresses through the workflow, user intents can be automatically generated by the understanding module 123 and can be communicatively coupled to the reasoning module 110 that determines the audio-visual guidance to be provided at the next instant.

The correlation module 102 correlates the scene and language data (if any exists) together, stores the scene and language data in the database 108 and correlates the data into a user state 105, which according to some embodiments comprises a model of user intent.

In some embodiments, the task mission understanding module 106 receives the user state 105 as input and generates a task understanding 107. The task understanding 107 is a representation of a set of goals 109 that the user is trying to achieve, based on the user state 105 and the scene understanding in the scene and language data. A plurality of task understandings can be generated by the task mission understanding module 106, where the plurality of tasks form a workflow ontology. The goals 109 are a plurality of goals which can include a hierarchy of goals, or, a task ontology, that must be completed for a task understanding to be considered complete. Each goal can have parent-goals, sub-goals, and so forth. According to some embodiments, there are pre-stored task understandings that a user can implement, such as "perform oil change", "check fluids" or the like, for which a task understanding does not have to be generated, only retrieved.

The task understanding 107 is coupled to the reasoning module 110 as an input. The reasoning module 110 processes the task understanding 107, along with task ontologies and workflow models from the database 108, and reasons about the next step in an interactive dialog that the AI-driven AR mentoring and collaboration system 100 needs to interact with the user to achieve the goals 109 of the task understanding 107. According to some embodiments, hierarchical action models are used to define tasking cues relative to the workflow ontologies that are defined. In some embodiments of the present principles, the reasoning module 110 determines which goal or sub-goal has priority in completion and reasons a next step based on the priority.

The output from the reasoning module 110 is input to the augmented reality generator 112 and the speech generator 114. The AR generator 112 created display content that takes the world model and user perspective from the at least one sensor 103 into account (i.e., task ontologies, next steps, display instructions, apparatus overlays, and the like, are modeled over the three-dimensional model of a scene stored in database 108 according to the user's perspective, as described in commonly owned U.S. Pat. No. 9,213,558, issued Dec. 15, 2015 and U.S. Pat. No. 9,082,402, issued Jul. 14, 2015, both of which are incorporated by reference in their entirety herein. The AR generator 112 can update a display the user sees in real-time as the user performs tasks, completes, tasks, goals, moves on to different tasks, and transitions from one environment to the next.

In the AI-driven AR mentoring and collaboration system 100 of FIG. 1, the speech generator 114 creates contextual dependent verbal cues in the form of responses to the user indicating the accuracy of the user's actions, next steps, related tips, and the like. In some embodiments, the output from the AR generator 112 and the speech generator 114 are synchronized to ensure that a user's experience is fluent and fully realized as an interactive training, or mentoring, environment.

In some embodiments, the optional performance module 120 actively analyzes the user's performance in following task ontologies, completing workflows, goals, and the like. The performance module 120 can then also output display updates and audio updates to the AR generator 112 and the speech generator 114. The performance module 120 can also interpret user actions against the task the user is attempting to accomplish. This, in turn, feeds the reasoning module 110 on next actions or verbal cues to present to the user.

Figure 4:
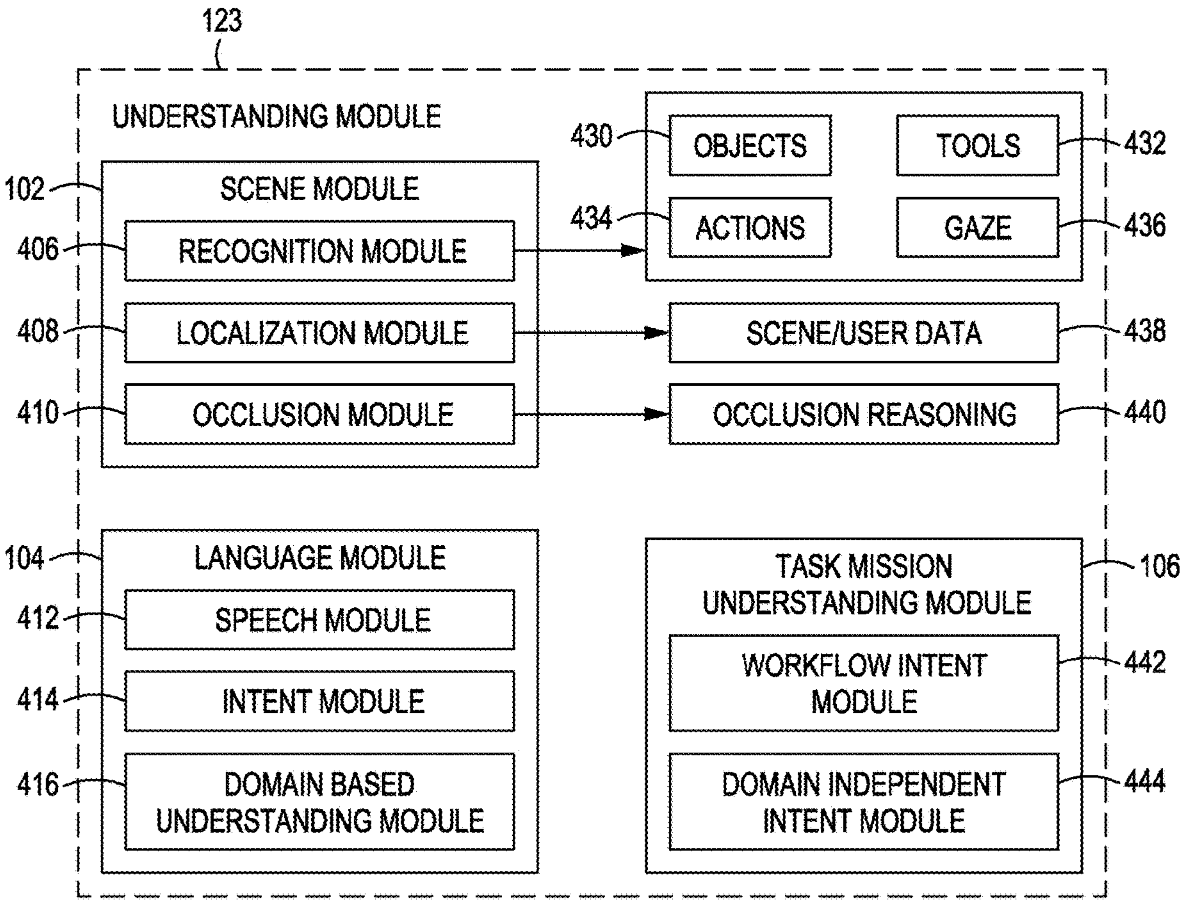
FIG. 4 depicts a high-level block diagram of the components of the understanding module of the AI-driven AR mentoring and collaboration system of FIG. 1 in accordance with an embodiment of the present principles.

FIG. 4 depicts a high-level block diagram of the components of the understanding module 123 of the AI-driven AR mentoring and collaboration system 100 of FIG. 1, and more specifically, the scene module 101, the language module 104 and the task mission understanding module 106, in accordance with an embodiment of the present principles. In the embodiment of the understanding module 123 of FIG. 4, the scene module 101 comprises a recognition module 406, a localization module 408 and an occlusion module 410. The recognition module 406 recognizes, for example objects 430, handheld (or otherwise) tools 432, users actions 434, user gaze 436, and the like. The localization module 408 generates scene and user localization data 438 which precisely situates the user relative to the scene 123 in FIG. 1 within six degrees of freedom. For mentoring applications, objects of interest (or the locale) are well defined. In such case the visual features of the object (or locale) can be extracted in advance for providing positioning with respect to the object in real-time. The localization module 408 performs Landmark matching/object recognition allowing for pre-building a landmark/object database of the objects/locales and using the database to define users' movements relative to these objects/locales. Using a head-mounted sensory device such as a helmet (not shown), imagery and 3D data can be collected to build 3D models and landmark databases of the objects of interest. Collected video features provide a high level of fidelity for precision localization that is not possible with a head-mounted IMU system alone. In some embodiments, the localization method of the present principles can be based on an error-state Kalman filter algorithm using both relative (local) measurements obtained from image-based motion estimation through visual odometry, and global measurements as a result of landmark/object matching through the pre-built visual landmark database. Exploiting the multiple-sensor data provides several layers of robustness to an AI-driven AR mentoring and collaboration system of the present principles.

In the embodiment of FIG. 4, the occlusion module 410 generates occlusion reasoning 440 that can include at least reasoning about objects being occluding and objects causing occlusion of other objects and determining depth based on the occlusions. In addition, the occlusion module 410 can evaluate the three-dimensional perspective of the scene in FIG. 1 to evaluate distances and occlusion form the user's perspective to the scene objects 430.

In some embodiments, the recognition module 406 uses the information generated by the localization module 408 to generate a model for user gaze 436 as well as the objects 430 and the tools 432 within the user's field of regard.

In the embodiment of the understanding module 123 of FIG. 4, the language module 104 comprises a speech module 412, an intent module 414 and a domain based understanding module 416. The speech module 414 recognizes a user's natural language speech. The intent module 414 determines a user's intent based on statistical classifications. The understanding module 416 performs, according to one embodiment, domain specific rule based understanding.

In the embodiment of FIG. 4, the speech module 412 converts speech to text and can be customized to a specific domain by developing the language and acoustic models, such as those described in "A Unified Framework for Constructing Multimodal Experiments and Applications", Cheyer, Julia and Martin, herein incorporated by reference in its entirety. In such embodiments, Automatic Speech Recognition (ASR) is based on developing models for a large-vocabulary continuous-speech recognition (LVCSR) system that integrates a hierarchy of information at linguistic, phonetic, and acoustic levels. ASR supports natural, spontaneous speech interactions driven by the user needs and intents. This capability contrasts with most interactive voice response (IVR) systems where the system directs the dialogue, and the user is constrained to a maze of questions and limited answers. In addition, ASR can also support speaker-independent spontaneous speech when the topic of the conversation is bounded to a specific domain.

In the embodiment of the understanding module 123 of FIG. 4, the intent module 414 can use statistics of large amounts of vocabulary and data and a sophisticated statistical model to characterize and distinguish the acoustic realization of the sounds of a language, and to accurately discriminate among a very large set of words (this statistical model is known as the "acoustic model"). In some embodiments, ASR can also use a second statistical model to characterize the probabilities of how words can be combined with each other. This second model is referred to as the "language model". More technically, the language model specifies the prior probability of word sequences based on the use of N-gram probabilities. For the resulting application to perform optimally, the training data must be as representative as possible of the actual data that would be seen in the real system operation. This in-domain data is necessary in addition to publicly available, out-of-domain data that can be used to complement the training of the needed statistical models.

In the embodiment of the understanding module 123 of FIG. 4, the domain based understanding module (DBUM) 416 is responsible for transforming the user's utterance in natural language, using speech input, into a machine-readable semantic representation of the user's goal. Natural Language Understanding (NLU) tasks can be divided into sub-components: 1) Event/intent classification: Determine the user goal in a given utterance and 2) Argument extraction: Determine the set of arguments associated with the user goal. Human language expresses meaning through various surface forms (e.g., prosody, lexical choice, and syntax), and the same meaning can be expressed in many different surface forms. These aspects are further accentuated in embodiments of conversational systems, in which the dialogue context plays a significant role in an utterance's meaning. Another aspect that is particularly important for spoken language understanding (SLU) is robustness to noise in the input. Unlike that of text understanding, the input to SLU is noisy because it is the output of a speech recognizer. In addition to this noise, spoken language is rampant with disfluencies, such as filled pauses, false starts, repairs, and edits. Hence, in order to be robust, the SLU architecture needs to cope with the noisy input from the beginning and not as an afterthought. Also, the meaning representation supports robust inference even in the presence of noise.

In the embodiment of the understanding module 123 of FIG. 4, the DBUM 416 employs the high-precision rule-based system to get intent and arguments of the user's request and use the statistical system of the intent module 414 only if needed (e.g., when user utterance cannot be parsed by the rule-based system or the intent is found ambiguous by the rule-based parser). As the coverage and accuracy of the statistical system increases with more in-domain data, a more complicated combination approach can be used in which the rule-based system and the statistical system will be weighed based on the parser confidences, using different weighting schemes.

In the understanding module 123 of the AI-driven AR mentoring and collaboration system 100 of FIG. 1, the task mission understanding module (TMUM) 106 comprises a workflow intent module 442 and a domain independent intent module 444. The task mission understanding module 106 interprets semantic frames which encodes the language and scene based representations against a workflow and its current state to determine user intent. A joint intent is formulated and relevant attributes that are associated with that intent are extracted and sent to the reasoning system.

Figure 5:
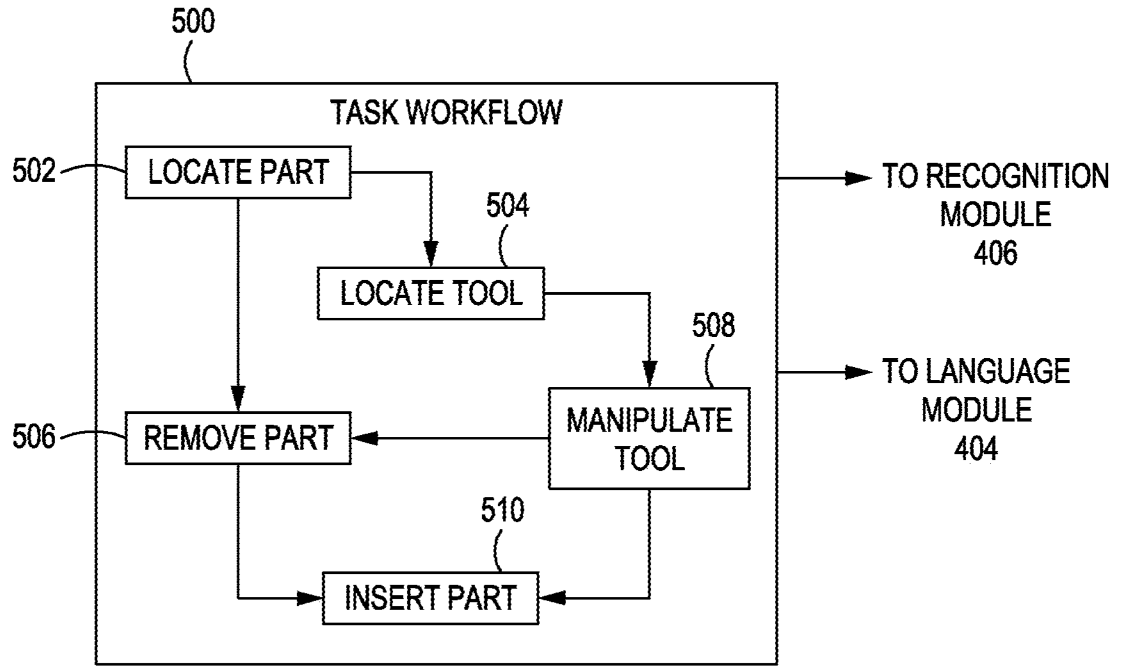
FIG. 5 depicts a workflow diagram of the task mission understanding module of the AI-driven AR mentoring and collaboration system of FIG. 1 in accordance with an embodiment of the present principles.

For example, a workflow 500 of the TMUM 106 in accordance with one embodiment of the present principles is shown in FIG. 5 in which an initial task is to "locate part" 502 (i.e. locate a machine part). The next step in the workflow can either be "locate tool 504" or "remove part 306". The workflow also contains the steps of "manipulate tool" 508 and "insert part 510" according to exemplary embodiments of the present principles. Workflow 500 is merely a sample workflow and many other workflows are storable in the present principles.

Referring back to FIG. 4, the TMUM 106 is further responsible for recognizing/interpreting user goals in a given state or context. The scene module 101 and language module 104 described above provide partial information about what the user is trying to do at a given time but usually individual components do not have access to all the information required to determine user goals. In the embodiment of FIG. 4, a primary objective of the TMUM 106 is to merge pieces of information coming from different components, such as scene understanding and language understanding in this case, as well as information that is coming from previous interactions (i.e., context/state information).

For example, a user might look at a particular object and say "where do I put this?" The scene module 101 identifies the location of objects in the scene and direction that the user is looking at (e.g., at a screwdriver), and the language module 104 identifies that the user is asking a question to locate the new position of an object but neither component has a complete understanding of user's real goal. By merging information generated by individual modules, an AI-driven AR mentoring and collaboration system of the present principles will determine that the user is "asking a question to locate the new position of a specific screwdriver". Furthermore, most of the time, it is not enough to understand only what the user said in the last utterance but also important to interpret that utterance in a given context of recent speech and scene data. In the running example, depending on the task the user is trying to complete, the question in the utterance might be referring to a "location for storing the screwdriver" or a "location for inserting the screwdriver into another object."

The TMUM 106 of the understanding module 123 of FIG. 4, in some embodiments merges three different semantic frames representing three different sources of information at any given time: 1. Semantic frame representing the scene (from the scene module 101), 2. Semantic frame extracted from the last user utterance (from the language module 104), 3. Semantic frame that represents the overall user goal up to that point (from prior interactions). The TMUM 106 can also utilize useful information about the user's history and characteristics to augment the context information, which could enable adapting and customizing the user interaction. Merging information, in accordance with the present principles can be accomplished using a hybrid approach that consists of at least: 1. A domain-independent unification mechanism that relies on an ontology structure that represents the events/intents in the domain and 2. Task-specific workflows using a workflow execution engine.

Figure 6:
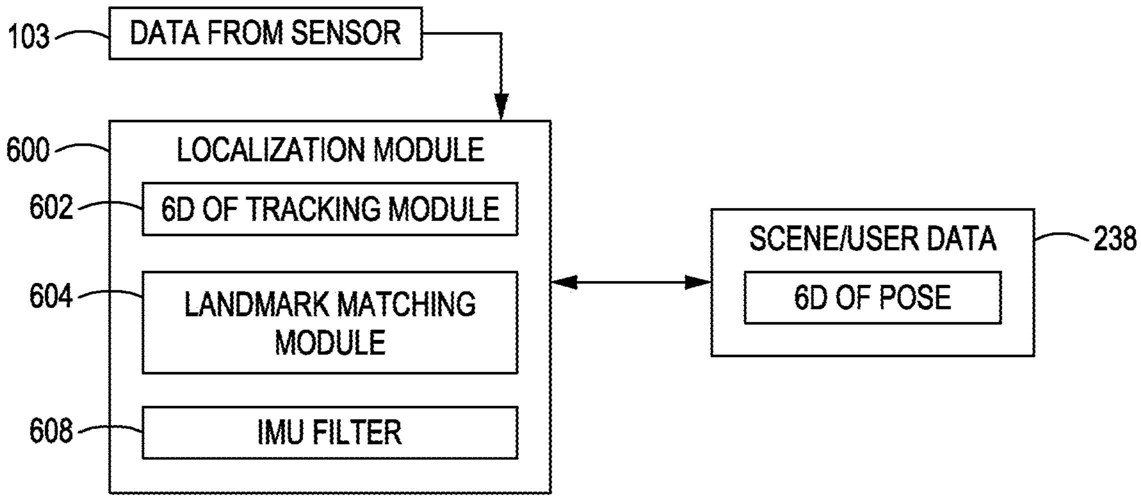
FIG. 6 depicts a high-level block diagram of the components of the localization module of the AI-driven AR mentoring and collaboration 100 of FIG. 1 in accordance with an embodiment of the present principles.

FIG. 6 depicts a high-level block diagram of the components of the localization module 208 of the AI-driven AR mentoring and collaboration system 100 of FIG. 1 in accordance with an embodiment of the present principles. In some embodiments, sensor data from the at least one sensor 103 includes video data, GPS data, and inertial measurement unit (IMU) data, amongst other data. The localization module 208 can receive the data as input and output scene and user data 238, which in some embodiments includes a 6 degree of freedom (6DOF) pose. In the embodiment of FIG. 6, the localization module 208 comprises a 6DOF tracking module 602, a landmark matching module 604 and an IMU filter 608. For example, an embodiment of the localization module of the present principles is fully described in commonly assigned, issued U.S. Pat. No. 7,925,049 for "Stereo-based visual odometry method and system", filed on Aug. 3, 2007, U.S. Pat. No. 8,174,568 for "Unified framework for precise vision-aided navigation" filed on Dec. 3, 2007, and U.S. Patent Application Publication Number 20100103196 for "SYSTEM AND METHOD FOR GENERATING A MIXED REALITY ENVIRONMENT", filed on Oct. 27, 2007, which are hereby incorporated by reference in their entireties.

Figure 7:
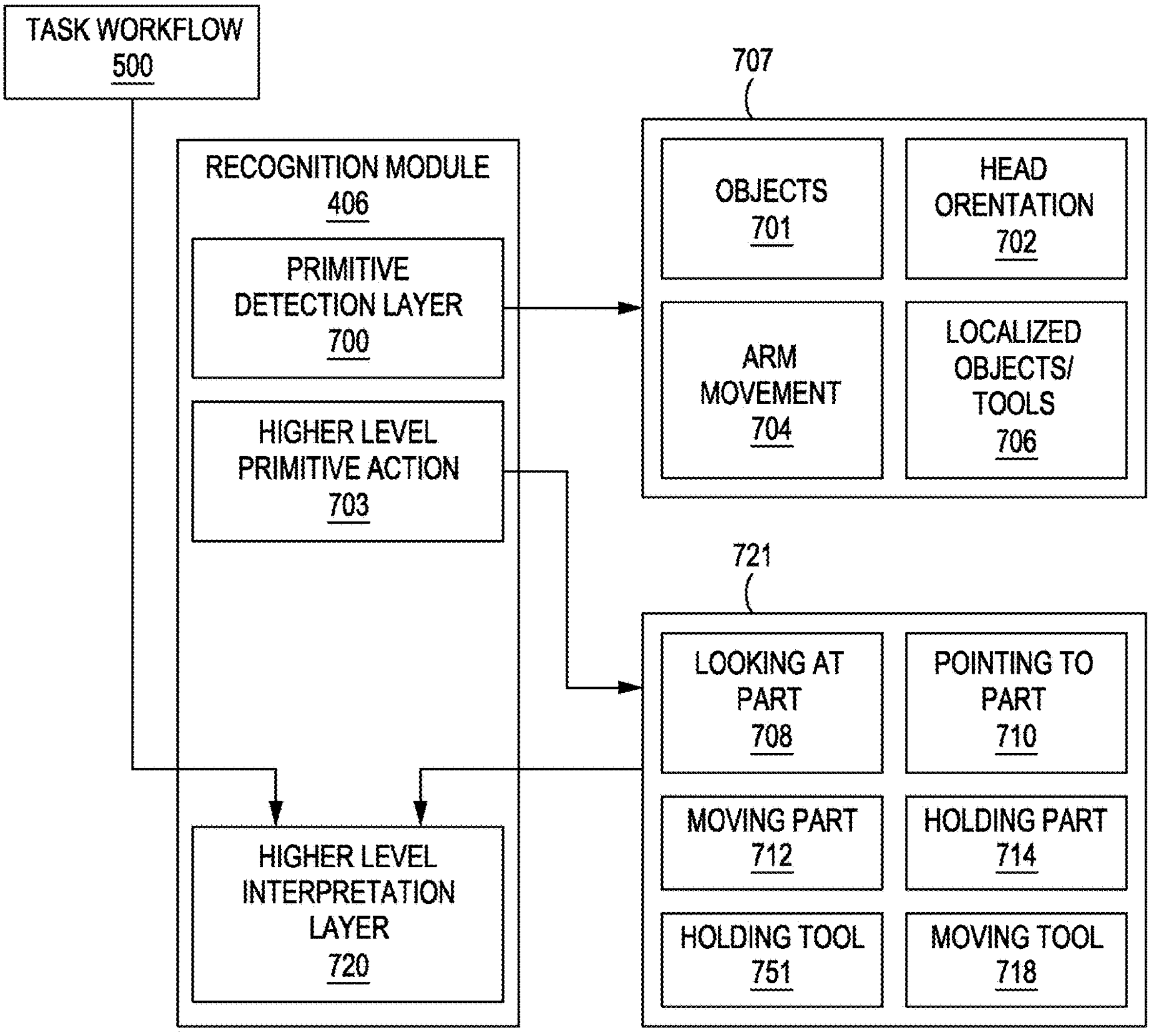
FIG. 7 depicts a high-level block diagram of the components of the recognition module of the AI-driven AR mentoring and collaboration system of FIG. 1 in accordance with an embodiment of the present principles.

FIG. 7 depicts a high-level block diagram of the components of the recognition module 406 of the AI-driven AR mentoring and collaboration system 100 of FIG. 1 in accordance with an embodiment of the present principles. In the embodiment of FIG. 7, the recognition module 406 comprises two layers of object recognition: the primitives detection layer 700 and the higher-level primitive action layer 703. In some embodiments, in the primitives detection layer 700, a scene localization 706 is first used to first establish objects 701 and head orientation 702 in the world (or local scene 153 as shown in FIG. 1). Additionally depth and optical flow based reasoning is used to locate dynamic components; for example, general movement of the arms within field of regard 704. In the higher level primitive action layer, the primitives 707 are combined to identify higher level action primitives 721 that are observed. According to some embodiments of the present principles, support vector machines can be used to classify such actions using the primitive detections from the first layer. For example, actions such as "looking at part 708", "pointing to part 710", "holding tool 716", "moving part 712", "holding part 714", and "moving tool 718" are classified using the primitives detected by the primitive detection layer 700. The third layer, the workflow interpretation layer 720, interprets the action primitives 721 against a context specific workflow model (e.g., task workflow 500 as shown in FIG. 5) and the current context within this model to identify new workflow states and transitions.

In some embodiments of the present principles, Hidden Markov Models (HMM) can be used to model the transitions of the finite-state machine that represents the task workflow 500 of FIG. 5. Associated output information (which can be referred to as scene-based semantic frames) from the workflow interpretation layer 720 can be communicated to the task mission understanding module 106 for fusion with language based cues. By limiting the object recognition to the world model of interest (of equipment being handled, for example) and knowing orientation and location of the world model relative to the user, enables parts of interest to be tracked through the operations of an AI-driven AR mentoring and collaboration system of the present principles, such as the AI-driven AR mentoring and collaboration system 100 of FIG. 1. Similarly by evaluating actions in the context of the task workflow 500 of FIG. 5 using the workflow interpretation layer 720, enables the determination of more reliable detections.

Figure 8:
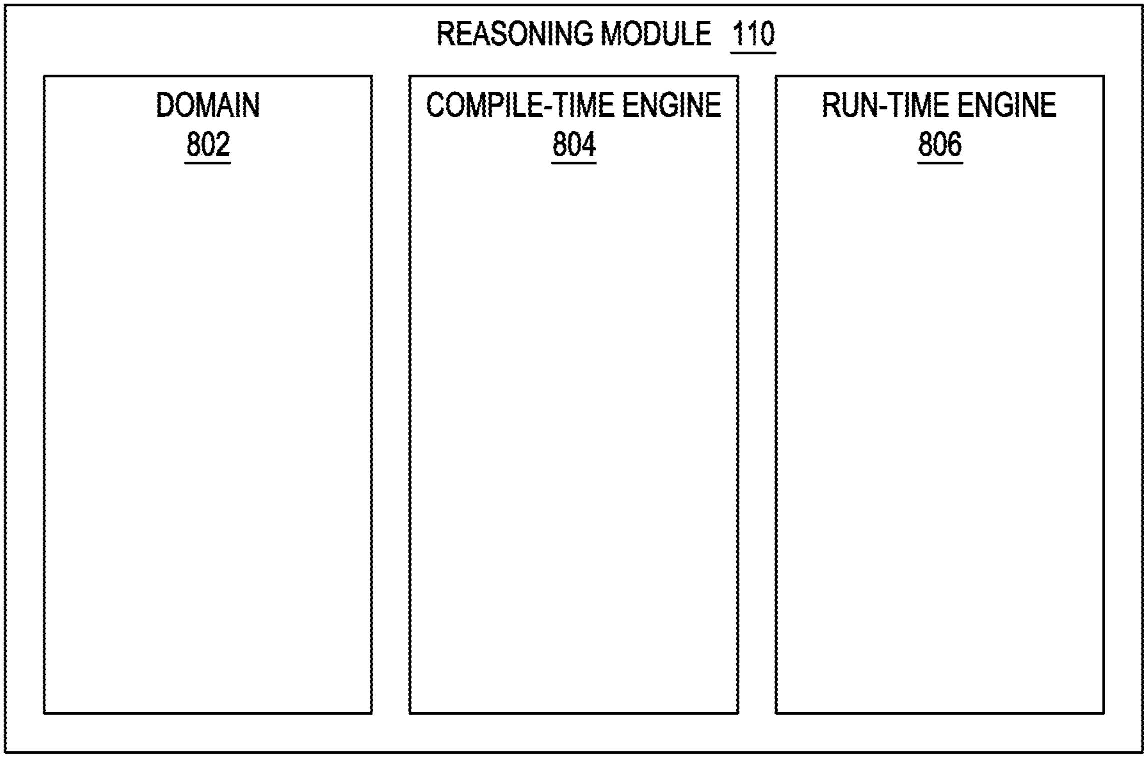
FIG. 8 depicts a high-level block diagram of the reasoning module of the AI-driven AR mentoring and collaboration system of FIG. 1 in accordance with an embodiment of the present principles.

FIG. 8 depicts a high-level block diagram of the reasoning module 110 of the AI-driven AR mentoring and collaboration system 100 of FIG. 1 in accordance with an embodiment of the present principles. In the embodiment of FIG. 8, the reasoning module 110 receives the detailed representation of the user's current state and goals as inputs, as determined by the TMUM 106 and produces a representation of an appropriate response, where the response can include audio dialog, UI displays, or some combination of the two according to one embodiment. The reasoning module 110 requires detailed domain knowledge to ensure that the AI-driven AR mentoring and collaboration system 100 responds correctly and takes appropriate action from a domain perspective, and that these responses and actions instill trust in a user of the AI-driven AR mentoring and collaboration system 100. Reasoning must calculate the next response or action of the AI-driven AR mentoring and collaboration system 100 using a variety of diverse sources: detailed knowledge of the domain's procedures and preferred styles of interaction; known information about the user, including their level of expertise in the domain; and the status of the context of the dialog with the user this far.

The detailed architecture of the reasoning module 110 as shown in FIG. 8 facilitates the acquisition of multifaceted domain knowledge 802 designed to drive user-system dialogs and interactions covering a wide variety of topics within the domain. This knowledge is then compiled by an engine 804 into machine-interpretable workflows along with (if necessary) a set of methods that interact with domain back-end systems—retrieving information from legacy databases, etc. Then at run time, the run-time engine 806 uses those compiled workflows to interpret user intents received from the understanding module 123 and determines the next step for the AI-driven AR mentoring and collaboration system 100 to take.

This step is represented as an AR mentor "Intent", and can encode dialog for the speech generator 114 to generate, actions or changes within the UI, both of those, or even neither of those (i.e., take no action). The reasoning module 110 of FIG. 8 acquires, designs and encodes the domain knowledge for user interaction in the task's chosen domain. Such actions can include identifying and designing all possible user Intents and AR-Mentor Intents for the portion of the domain covered, designing dialogs that anticipate a wide variety of possible conditions and user responses, and developing APIs for any domain back-end systems used in our system.

The reasoning module 110 can track events being observed in a heads-up display, determines the best modality to communicate a concept to the user of the heads-up display, dynamically composes multimodal (UI and language) "utterances", manages the amount of dialog vs. the amount of display changes in the interaction, and the like. According to one embodiment, AR mentor "Intents" also accommodate robust representation of a variety of events recognized by the recognition module 406 depicted in FIG. 4, and can incorporate a spatial reasoning plug-in specifically to develop dialog based on user perspective and object placements in the world. According to another embodiment, the reasoning module 110 can estimate the information value to the user of various types and modalities of output to determine coherent and synchronous audio-visual feedback.

The reasoning module 110 can further initiate dialogs based on exogenous events ("exogenous" in the sense that they occur outside the user-mentor dialog), which can include the current assessment of the AI-driven AR mentoring and collaboration system 100 of an ongoing operation/maintenance process it is monitoring by extending a "proactive offer" functionality, and enhance the representation of the input it uses to make next-step decisions.

Figure 9:
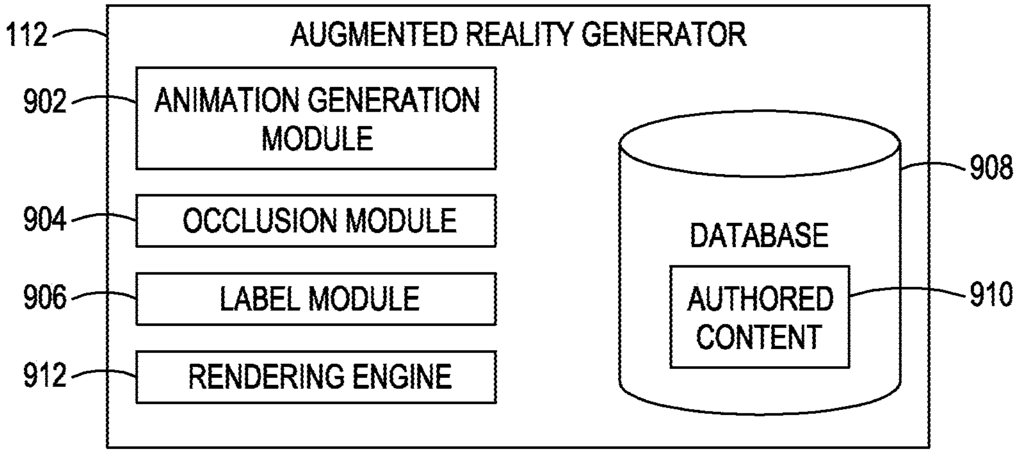
FIG. 9 depicts a high-level block diagram of the AR generator of the AI-driven AR mentoring and collaboration system of FIG. 1 in accordance with an embodiment of the present principles.

FIG. 9 depicts a high-level block diagram of the AR generator 112 of the AI-driven AR mentoring and collaboration system 100 of FIG. 1 in accordance with an embodiment of the present principles. In the embodiment of FIG. 9, the AR generator 112 uses computed head poses to accurately render animations and instructions on a user display, for example, AR goggles, so that the rendered objects and effects appear as if they are part of the scene. The AR generator 112 can provide low-lag realistic overlays that match precisely with a real-world scene.

In some embodiments, the AR generator 112 of the AI-driven AR mentoring and collaboration system 100 of FIG. 1 relies on the localization module 408 of the scene module 101, as shown in FIG. 4, to obtain an accurate head pose. The generated pose accounts for delays in the video processing and rendering latencies to make the overlays correctly appear in the world scene. The animation generation module 902 of the embodiment of the AR generator 112 of FIG. 9, requests from the localization module 408 to predict a pose just-in-time for rendering to a display. On such request the localization modules 408 can implement a Kalman Filter to exploit a high-rate IMU input to accurately predict the location and orientation of a user's head, in one embodiment, in approximately 5-10 msec.

In the embodiment of the AR generator 112 of FIG. 9, the occlusion module 904 works with dynamic depth maps in its rendering pipeline. The dynamic depth that is obtained from the scene module 101, as depicted in FIG. 4, can be fused with information from computer aided drawing models (for the scene or objects) that are available to create consistent occlusion masks for rendering to the display. This ensures correct 3D layering between the rendered objects against the real-world scene. In the embodiment of FIG. 9, the AR generator 112 further comprises a label module 906 for labeling objects in the scene and organizing these labels on the rendered view. In some embodiments, the AR generator 112 relies upon a well-organized pre-authored domain specific content stored in database 908 to enable intuitive instructions. The authored content 910 is organized hierarchically and incorporated within the logic of the reasoning module 110 to ensure intuitive triggering of the scripts. Based on these higher-level instructions, in the embodiment of FIG. 9, a rendering engine 912 will sequence through lower-level set of animations and visualizations with intuitive transitions.

Figure 10:
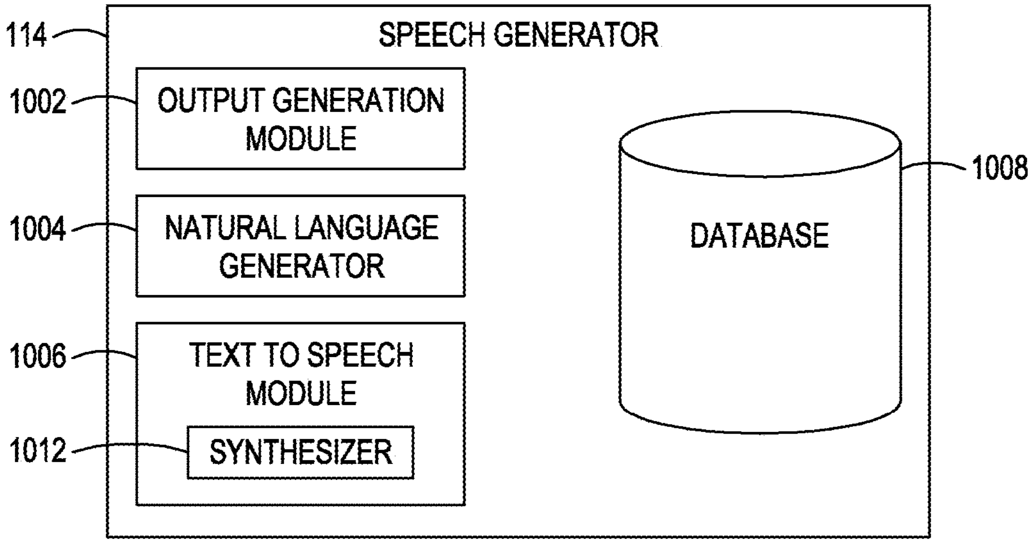
FIG. 10 depicts a high-level block diagram of the speech generator of the AI-driven AR mentoring and collaboration system of FIG. 1 in accordance with an embodiment of the present principles.

FIG. 10 depicts a high-level block diagram of the speech generator 114 of the AI-driven AR mentoring and collaboration system 100 of FIG. 1 in accordance with an embodiment of the present principles. In the embodiment of FIG.

10, the speech generator 114 comprises an output generation module 1002, a natural language generator (NLG) 1004 and a text to speech module 1006. The output generation module 1002 can receive inputs from the reasoning module 110 depicted in FIG. 9, such as actions, and converts the inputs into different forms of action representations such as text, speech, domain specific actions, and UI manipulations, as appropriate for the user and the environment. In some embodiments, the NLG 1004 implements hierarchical output templates with fixed and optionally variable portions, that can be generated on the fly using linguistic tools, to generate system responses in a given interaction with the user. Each action generated by the reasoning module 110 can have an associated prompt template, and the system can choose a most appropriate response by synthesizing the variable portion of the response.

The responses from the NLG 1004 can be customized according to the user as well as the state of the simulated interaction, such as the training, repair operation, maintenance, etc. The speech generator 114 can optionally take advantage of external speech cues, language cues and other cues coming from the scene to customize the responses. In various cases, the NLG 1004 leverages visual systems such as AR and a user interface on a display to provide the most natural response. As an example, the NLG 1004 can output "Here is the specific component" and use the AR generator 112, as depicted in FIG. 1 and/or FIG. 9, to show the component location with an overlaid arrow rather than verbally describing the location of that component.

In the embodiment of FIG. 10, the text to speech module 1006 converts output text to speech, so that an answer from the reasoning module 110 can be played back as audio to the user. The text to speech module 1006 can use selection concatenative synthesis. This approach uses a large database 1008 of prerecorded and segmented speech from one speaker. The database 1008 can be created by segmenting each utterance into multiple units of different length, such as phones, diphones, syllables, morphemes, words and phrases. In some embodiments, to generate an arbitrary output the synthesizer 1012 can determine the best chain of candidate units from the database 1008 in a process known as unit selection. The chosen segments are smoothly concatenated and played back. Unit selection synthesis offers high level natural speech, mostly when the text to synthesize can be covered by sets of longer units. According to one embodiment, the text to speech module 1006 can be implemented using the TTS product from NEOSPEECH.

Figure 11:
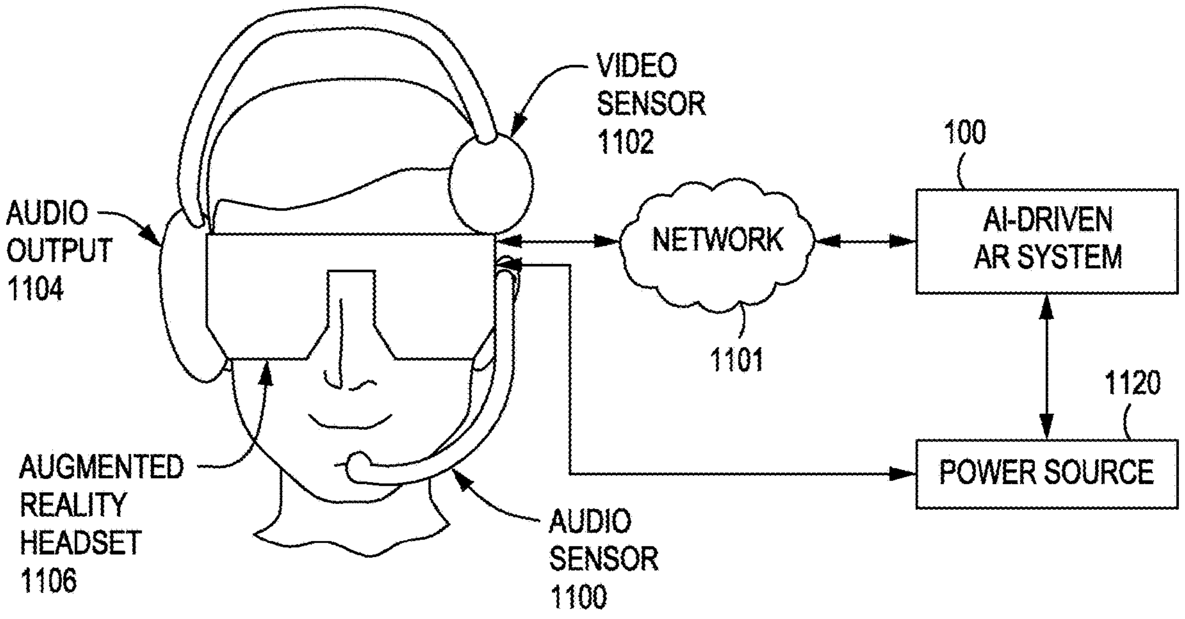
FIG. 11 depicts an implementation of an AI-driven AR mentoring and collaboration system in accordance with at least one exemplary embodiment of the present principles.

FIG. 11 depicts an implementation of an AI-driven AR mentoring and collaboration system of the present principles, such as the AI-driven AR mentoring and collaboration system 100 of FIG. 1, in accordance with at least one exemplary embodiment of the present principles. In the embodiment of FIG. 11, the AI-driven AR mentoring and collaboration system 100 is coupled to an AR headset 906 over a network 901. In other embodiments, the AI-driven AR mentoring and collaboration system 100 can be directly communicatively coupled to the AR headset 1106. The AR headset 1106 is coupled to a video sensor 1102, an audio sensor 1100 and an audio output 1104. In the embodiment of FIG. 11, the video sensor 1102 and the audio sensor 1100 can be a part of the at least one sensor 103 of FIG. 1. In some embodiments, the AR headset 1106 can also comprise an IMU unit which is not shown. The AR headset 906 can be used by the AI-driven AR mentoring and collaboration system 100 to both sense the environment using audio, visual and inertial measurements and to output guidance to the user through natural language spoken dialogue through the audio output 1104, headphones, and visual cues augmented on the user's head mounted display, the headset 1106. The wearable system provides for a heads-up, hands-free unencumbered interface so that the user is able to observe and manipulate the objects in front of him freely and naturally. In the embodiment of FIG. 11, the power source 1120 is provided to provide power to the AR headset 1106.

In some embodiments of the present principles, clip on sensor packages (not shown) can be utilized to reduce weight. In some embodiments, the video sensor can comprise an ultra-compact USB2.0 camera from XIMEA (MU9PC_HM) with high resolution and sensitivity for AR, with a 5.7×4.28 mm footprint. Alternatively, a stereo sensor and light-weight clip-on bar structure can be used for the camera. The IMU sensor can be an ultra-compact MEMs IMU (accelerometer, gyro) developed by INERTIAL LABS that also incorporates a 3 axis magnetometer. In an alternate embodiment, the XSENS MTI-G SENSOR, which incorporates a GPS, can be used as the IMU sensor.

In the embodiment of FIG. 11, the headset 1106 can include a see-through display such as the INTEVAC I-PORT 75, or the IMMERSION INTERNATIONAL head mounted display with embedded speakers (HMD). In some embodiments, the processor in which an embodiment of the AI-driven AR mentoring and collaboration system of the present principles can be implemented can be a compact sealed processor package incorporating a PC-104 form factor INTEL i-7 based computer, or a 4 core I-7 enclosed within a ruggedized sealed package. Alternatively, an AI-driven AR mentoring and collaboration system of the present principles can be deployed on a smart tablet or smart phone and can communicate with the headset 906 through the network 901 or a direct coupling. In some embodiments, the generated AR can be shown through a wall mounted or table mounted display along with speaker systems, in which cameras and microphones are set up in a room to provide an AR mentoring experience. In the embodiment of FIG. 11, the power source 1120 can be a battery pack designed to fit a military style vest with MOLE straps according to one embodiment.

Figure 12:
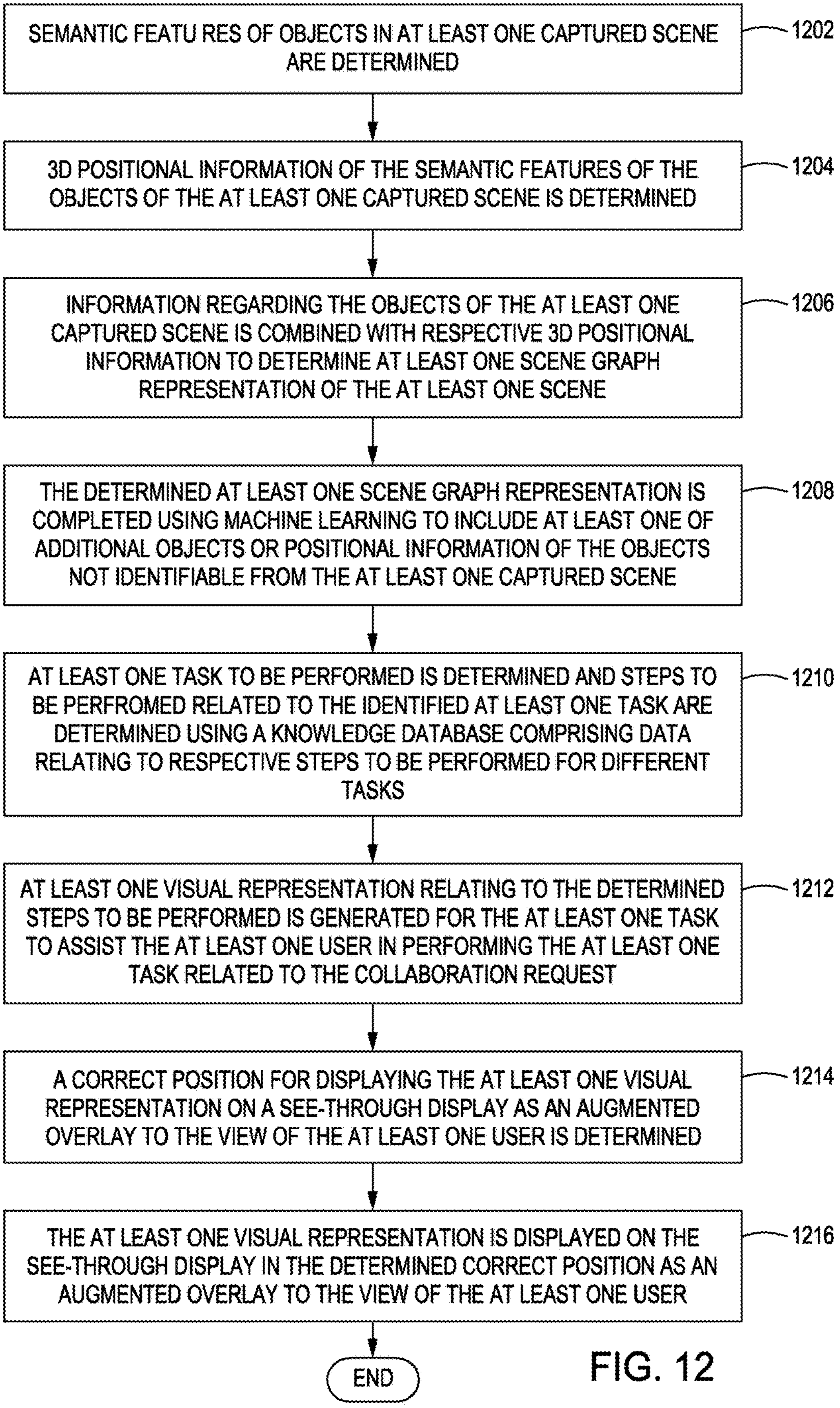
FIG. 12 depicts a flow diagram of a method for AI-driven augmented reality mentoring and collaboration in accordance with an embodiment of the present principles.

FIG. 12 depicts a flow diagram of a method 1200 for AI-driven augmented reality mentoring and collaboration in accordance with an embodiment of the present principles. The method 1200 can begin at 1202 during which semantic features of objects in at least one captured scene are determined. As described above, in some embodiments a machine learning system of a scene module of an AI-driven AR mentoring and collaboration system of the present principles can be trained using a plurality (e.g., hundreds, thousands, millions, etc.) of instances of labeled scene data (e.g., pixels) in which the training data comprises a plurality of labeled data to train a machine learning system of the present principles to recognize/identify and label objects in received scene data using, for example, semantic segmentation. The method 1200 can proceed to 1204.

At 1204, 3D positional information of the objects in the at least one captured scene is determined using depth information of the objects in the captured scene. As described above, in some embodiments depth information can be determined using a sensor capable of providing depth information for captured images and alternatively or in addition, in some embodiments of the present principles, depth information of a scene can be determined using image-based methods such as monocular image-based methods including depth estimation of images. The depth information can be used to determine 3D positional information of the objects in the at least one captured scene. The method 1200 can proceed to 1206.

At 1206, information regarding the identified objects of the at least one captured scene is combined with respective 3D positional information to determine at least one scene graph representation of the at least one scene, which provides information regarding positions of the identified objects in the at least one captured scene and spatial relationships among the identified objects. The method can proceed to 1208.

At 1208, the determined at least one scene graph representation is completed using machine learning to include additional objects or positional information of the objects not identifiable from the at least one captured scene. The method 1200 can proceed to 1210.

At 1210, at least one task to be performed is determined and steps to be performed related to the identified at least one task are determined using a knowledge database comprising data relating to respective steps to be performed for different tasks. As described above, in some embodiments a task to be performed can be determined from language received in a user collaboration request. Alternatively or in addition, in some embodiments, a task to be performed can be determined by generating a scene understanding of the at least one captured scene based on an automated analysis of the at least one captured scene, wherein the at least one captured scene comprises a view of a user during performance of a task related to the identified at least one object in the at least one captured scene. The method 1200 can proceed to 1212.

At 1212, at least one visual representation relating to the determined steps to be performed is generated for the at least one task to assist the at least one user in performing the at least one task related to the collaboration request. The method 1200 can proceed to 1214.

At 1214, a correct position for displaying the at least one visual representation on a see-through display as an augmented overlay to the view of the at least one user is determined using the completed scene graph. The method 1200 can proceed to 1216.

At 1216, the at least one visual representation is displayed on the see-through display in the determined correct position as an augmented overlay to the view of the at least one user to guide the at least one user to perform the at least one task. The method 1200 can be exited.

In some embodiments, the method can further include extracting one or more visual cues from the at least one captured scene to situate the user in relation to the identified at least one object or the device, wherein the user is situated by tracking a head orientation of the user, and wherein the at least one visual representation is rendered based on a predicted head pose of the user based on the tracked head orientation of the user.

In some embodiments, the method can further include analyzing actions of the user during the performance of a step of the task by using information related to a next step of the task, wherein, if the user has not completed the next step of the task, new visual representations are created to be generated and presented as an augmented overlay to guide the user to complete the performance of the next step of the task, and wherein, if the user has completed the next step of the task and a subsequent step of the task exists, new visual representations are created to be generated and presented as an overlay to guide the user to complete the performance of the subsequent step of the task.

In some embodiments of the method, the at least one captured scene includes both video data and audio data, the video data comprising a view of the user of a real-world scene during performance of a task and the audio data comprising speech of the user during performance of the task, and wherein the steps relating to the performance of the task are further determined using at least one of the video data or the audio data.

In some embodiments, an AI-driven AR mentoring and collaboration system of the present principles can include two or more users working in conjunction, in which received and determined information is shared among the two or more users, wherein a correct position for displaying the at least one visual representation on a see-through display as an augmented overlay to the view of the two or more users is determined using information in at least one completed scene graph.

Figure 13:
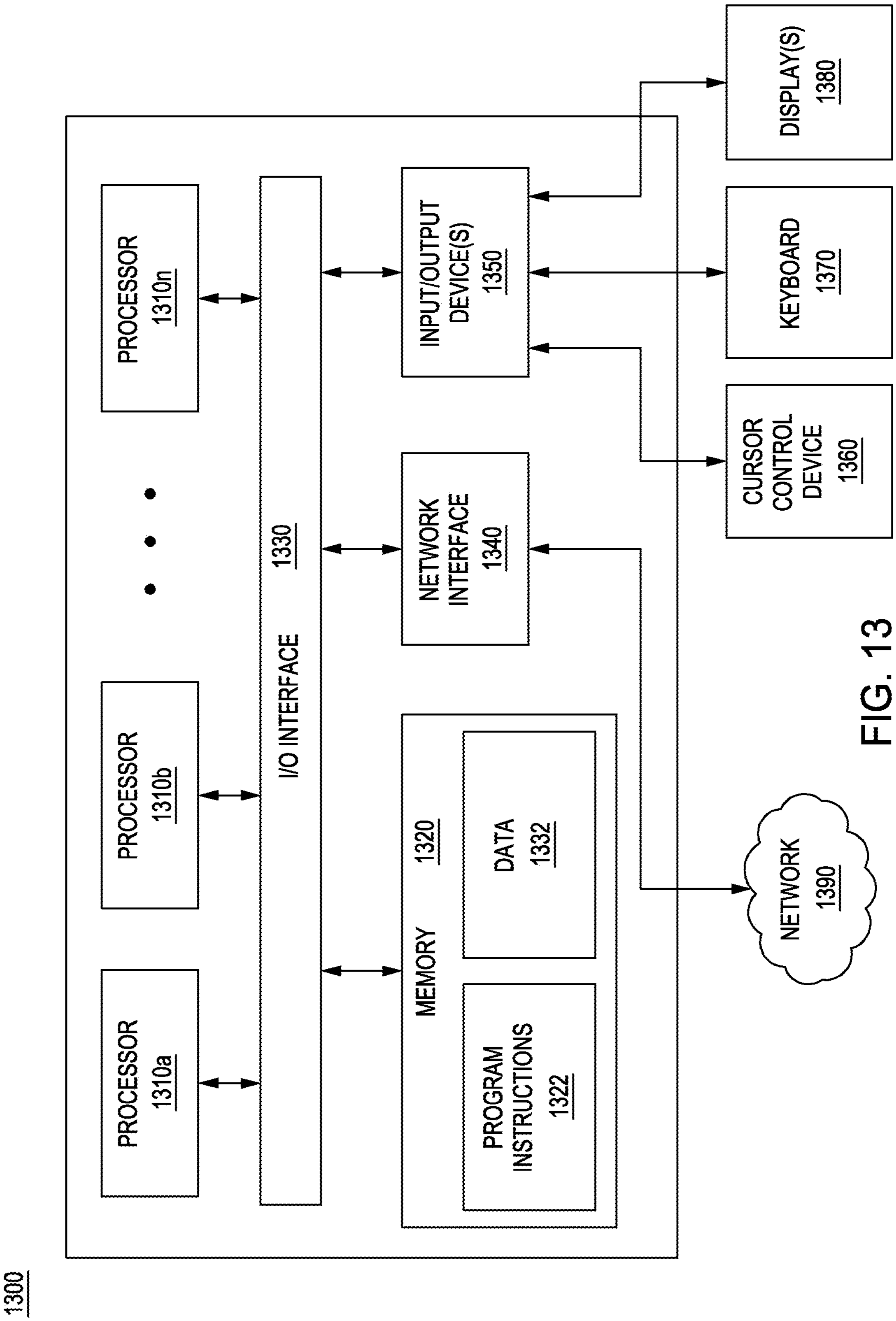
FIG. 13 depicts a high-level block diagram of an embodiment of a computing device suitable for use with embodiments of an AI-driven AR mentoring and collaboration system of the present principles.

As depicted in FIG. 1, embodiments of an AI-driven AR mentoring and collaboration system of the present principles, such as the AI-driven AR mentoring and collaboration system 110 of FIG. 1, can be implemented in a computing device 1300. For example, FIG. 13 depicts a high-level block diagram of a computing device 1300 suitable for use with embodiments of an AI-driven AR mentoring and collaboration system of the present principles, such as the AI-driven AR mentoring and collaboration system 110 of FIG. 1. In the embodiment of FIG. 13, the computing device 1300 includes one or more processors 1310*a*-1310*n* coupled to a system memory 1320 via an input/output (I/O) interface 1330. The computing device 1300 further includes a network interface 1340 coupled to I/O interface 1330, and one or more input/output devices 1350, such as cursor control device 1360, keyboard 1370, and display(s) 1380. In various embodiments, a user interface can be generated and displayed on display 1380. In some cases, it is contemplated that embodiments can be implemented using a single instance of a computing device 1300, while in other embodiments multiple such systems, or multiple nodes making up the computing device 1300, can be configured to host different portions or instances of various embodiments. For example, in one embodiment some elements can be implemented via one or more nodes of the computing device 1300 that are distinct from those nodes implementing other elements. In another example, multiple nodes may implement the computing device 1300 in a distributed manner.

In different embodiments, the computing device 1300 can be any of various types of devices, including, but not limited to, a personal computer system, desktop computer, laptop, notebook, tablet or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, the computing device 1300 can be a uniprocessor system including one processor 1310, or a multiprocessor system including several processors 1310 (e.g., two, four, eight, or another suitable number). Processors 1310 can be any suitable processor capable of executing instructions. For example, in various embodiments processors 1310 may be general-purpose or embedded processors implementing any of a variety of instruction set architectures (ISAs). In multiprocessor systems, each of processors 1310 may commonly, but not necessarily, implement the same ISA.

System memory 1320 can be configured to store program instructions 1322 and/or, in some embodiments, machine learning systems that are accessible by the processor 1310. In various embodiments, system memory 1320 can be implemented using any suitable memory technology, such as static random-access memory (SRAM), synchronous dynamic RAM (SDRAM), nonvolatile/Flash-type memory, or any other type of memory. In the illustrated embodiment, program instructions and data implementing any of the elements of the embodiments described above can be stored within system memory 1320. In other embodiments, program instructions and/or data can be received, sent or stored upon different types of computer-accessible media or on similar media separate from the system memory 1320 or the computing device 1300.

In one embodiment, I/O interface 1330 can be configured to coordinate I/O traffic between processor 1310, system memory 1320, and any peripheral devices in the device, including network interface 1340 or other peripheral interfaces, such as input/output devices 1350. In some embodiments, I/O interface 1330 can perform any necessary protocol, timing or other data transformations to convert data signals from one component (e.g., system memory 1320) into a format suitable for use by another component (e.g., processor 1310). In some embodiments, I/O interface 1330 can include support for devices attached through various types of peripheral buses, such as a variant of the Peripheral Component Interconnect (PCI) bus standard or the Universal Serial Bus (USB) standard, for example. In some embodiments, the function of I/O interface 1330 can be split into two or more separate components, such as a north bridge and a south bridge, for example. Also, in some embodiments some or all of the functionality of I/O interface 1330, such as an interface to system memory 1320, can be incorporated directly into processor 1310.

Network interface 1340 can be configured to allow data to be exchanged between the computing device 1300 and other devices attached to a network (e.g., network 1390), such as one or more external systems or between nodes of the computing device 1300. In various embodiments, network 1390 can include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1340 can support communication via wired or wireless general data networks, such as any suitable type of Ethernet network, for example; via digital fiber communications networks; via storage area networks such as Fiber Channel SANs, or via any other suitable type of network and/or protocol.

Input/output devices 1350 can, in some embodiments, include one or more display terminals, keyboards, keypads, touchpads, scanning devices, voice or optical recognition devices, or any other devices suitable for entering or accessing data by one or more computer systems. Multiple input/output devices 1350 can be present in computer system or can be distributed on various nodes of the computing device 1300. In some embodiments, similar input/output devices can be separate from the computing device 1300 and can interact with one or more nodes of the computing device 1300 through a wired or wireless connection, such as over network interface 1340.

Those skilled in the art will appreciate that the computing device 1300 is merely illustrative and is not intended to limit the scope of embodiments. In particular, the receiver/control unit and peripheral devices can include any combination of hardware or software that can perform the indicated functions of various embodiments, including computers, network devices, Internet appliances, PDAs, wireless phones, pagers, and the like. The computing device 1300 can also be connected to other devices that are not illustrated, or instead can operate as a stand-alone system. In addition, the functionality provided by the illustrated components can in some embodiments be combined in fewer components or distributed in additional components. Similarly, in some embodiments, the functionality of some of the illustrated components may not be provided and/or other additional functionality can be available.

The computing device 1300 can communicate with other computing devices based on various computer communication protocols such a Wi-Fi, Bluetooth® (and/or other standards for exchanging data over short distances includes protocols using short-wavelength radio transmissions), USB, Ethernet, cellular, an ultrasonic local area communication protocol, etc. The computing device 1300 can further include a web browser.

Although the computing device 1300 is depicted as a general purpose computer, the computing device 1300 is programmed to perform various specialized control functions and is configured to act as a specialized, specific computer in accordance with the present principles, and embodiments can be implemented in hardware, for example, as an application specified integrated circuit (ASIC). As such, the process steps described herein are intended to be broadly interpreted as being equivalently performed by software, hardware, or a combination thereof.

Figure 14:
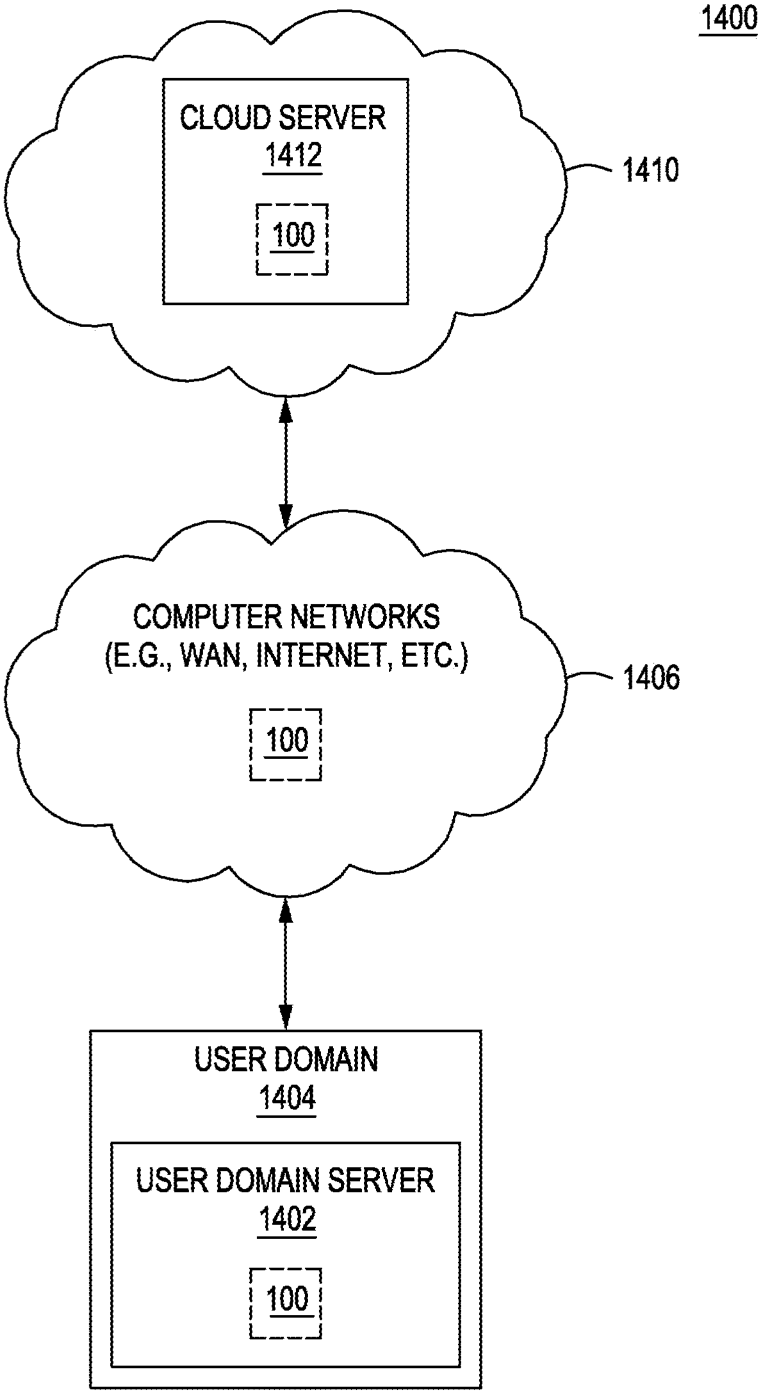
FIG. 14 depicts a high-level block diagram of a network in which embodiments of an AI-driven AR mentoring and collaboration system in accordance with the present principles can be implemented.

FIG. 14 depicts a high-level block diagram of a network in which embodiments of an AI-driven AR mentoring and collaboration system in accordance with the present principles, such as the AI-driven AR mentoring and collaboration system 100 of FIG. 1, can be implemented. The network environment 1400 of FIG. 14 illustratively comprises a user domain 1402 including a user domain server/computing device 1404. The network environment 1400 of FIG. 14 further comprises computer networks 1406, and a cloud environment 1410 including a cloud server/computing device 1412.

In the network environment 1400 of FIG. 14, an AI-driven AR mentoring and collaboration system in accordance with the present principles, such as the AI-driven AR mentoring and collaboration system 100 of FIG. 1, can be included in at least one of the user domain server/computing device 1404, the computer networks 1406, and the cloud server/computing device 1412. That is, in some embodiments, a user can use a local server/computing device (e.g., the user domain server/computing device 1404) to provide AI-driven AR mentoring and collaboration in accordance with the present principles. In some embodiments, a user can implement an AI-driven AR mentoring and collaboration system in accordance with the present principles, such as the AI-driven AR mentoring and collaboration system 100 of FIG. 1 in the computer networks 1406 to provide AI-driven AR mentoring and collaboration in accordance with the present principles. Alternatively or in addition, in some embodiments, a user can provide an AI-driven AR mentoring and collaboration system of the present principles in the cloud server/computing device 1412 of the cloud environment 1410. For example, in some embodiments it can be advantageous to perform processing functions of the present principles in the cloud environment 1410 to take advantage of the processing capabilities and storage capabilities of the cloud environment 1410.

In some embodiments in accordance with the present principles, an AI-driven AR mentoring and collaboration system in accordance with the present principles can be located in a single and/or multiple locations/servers/computers to perform all or portions of the herein described functionalities of a system in accordance with the present principles. For example, in some embodiments some components of a AI-driven AR mentoring and collaboration system of the present principles can be located in one or more than one of the user domain 1402, the computer network environment 1406, and the cloud environment 1410 for providing the functions described above either locally or remotely.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components can execute in memory on another device and communicate with the illustrated computer system via inter-computer communication. Some or all of the system components or data structures can also be stored (e.g., as instructions or structured data) on a computer-accessible medium or a portable article to be read by an appropriate drive, various examples of which are described above. In some embodiments, instructions stored on a computer-accessible medium separate from a computing device can be transmitted to the computing device via transmission media or signals such as electrical, electromagnetic, or digital signals, conveyed via a communication medium such as a network and/or a wireless link. Various embodiments can further include receiving, sending or storing instructions and/or data implemented in accordance with the foregoing description upon a computer-accessible medium or via a communication medium. In general, a computer-accessible medium can include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods and processes described herein may be implemented in software, hardware, or a combination thereof, in different embodiments. In addition, the order of methods can be changed, and various elements can be added, reordered, combined, omitted or otherwise modified. All examples described herein are presented in a non-limiting manner. Various modifications and changes can be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances can be provided for components described herein as a single instance. Boundaries between various components, operations and data stores are somewhat arbitrary, and particular operations are illustrated in the context of specific illustrative configurations. Other allocations of functionality are envisioned and can fall within the scope of claims that follow. Structures and functionality presented as discrete components in the example configurations can be implemented as a combined structure or component. These and other variations, modifications, additions, and improvements can fall within the scope of embodiments as defined in the claims that follow.

In the foregoing description, numerous specific details, examples, and scenarios are set forth in order to provide a more thorough understanding of the present disclosure. It will be appreciated, however, that embodiments of the disclosure can be practiced without such specific details. Further, such examples and scenarios are provided for illustration, and are not intended to limit the disclosure in any way. Those of ordinary skill in the art, with the included descriptions, should be able to implement appropriate functionality without undue experimentation.

References in the specification to "an embodiment," etc., indicate that the embodiment described can include a particular feature, structure, or characteristic, but every embodiment may not necessarily include the particular feature, structure, or characteristic. Such phrases are not necessarily referring to the same embodiment. Further, when a particular feature, structure, or characteristic is described in connection with an embodiment, it is believed to be within the knowledge of one skilled in the art to affect such feature, structure, or characteristic in connection with other embodiments whether or not explicitly indicated.

Embodiments in accordance with the disclosure can be implemented in hardware, firmware, software, or any combination thereof. Embodiments can also be implemented as instructions stored using one or more machine-readable media, which may be read and executed by one or more processors. A machine-readable medium can include any mechanism for storing or transmitting information in a form readable by a machine (e.g., a computing device or a "virtual machine" running on one or more computing devices). For example, a machine-readable medium can include any suitable form of volatile or non-volatile memory.

In addition, the various operations, processes, and methods disclosed herein can be embodied in a machine-readable medium and/or a machine accessible medium/storage device compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium/storage device.

Modules, data structures, and the like defined herein are defined as such for ease of discussion and are not intended to imply that any specific implementation details are required. For example, any of the described modules and/or data structures can be combined or divided into sub-modules, sub-processes or other units of computer code or data as can be required by a particular design or implementation.

In the drawings, specific arrangements or orderings of schematic elements can be shown for ease of description. However, the specific ordering or arrangement of such elements is not meant to imply that a particular order or sequence of processing, or separation of processes, is required in all embodiments. In general, schematic elements used to represent instruction blocks or modules can be implemented using any suitable form of machine-readable instruction, and each such instruction can be implemented using any suitable programming language, library, application-programming interface (API), and/or other software development tools or frameworks. Similarly, schematic elements used to represent data or information can be implemented using any suitable electronic arrangement or data structure. Further, some connections, relationships or associations between elements can be simplified or not shown in the drawings so as not to obscure the disclosure.

While the foregoing is directed to embodiments of the present principles, other and further embodiments of the invention can be devised without departing from the basic scope thereof, and the scope thereof is determined by the claims that follow.

The invention claimed is:

1. A method for AI-driven augmented reality mentoring and collaboration, comprising:

determining semantic features of objects in at least one captured scene using a deep learning algorithm to identify the objects in the at least one scene;

determining 3D positional information of the objects in the at least one captured scene;

combining information regarding the identified objects of the at least one captured scene with respective 3D positional information to determine at least one intermediate representation of the at least one scene, which provides information regarding positions of the identified objects in the at least one captured scene and spatial relationships among the identified objects;

completing the determined at least one intermediate representation using a machine learning model trained, using a plurality of scenes having objects related to the captured scene, to identify at least objects and positions for objects in scenes to include additional objects or positional information of the objects not identifiable from the at least one captured scene;

determining at least one task to be performed and determining steps to be performed related to the identified at least one task using a knowledge database comprising data relating to respective steps to be performed for different tasks;

generating at least one visual representation relating to the determined steps to be performed for the at least one task to assist the at least one user in performing the at least one task;

determining a correct position for displaying the at least one visual representation on a see-through display as an augmented overlay to the view of the at least one user using information in the at least one completed intermediate representation; and displaying the at least one visual representation on the see-through display in the determined correct position as an augmented overlay to the view of the at least one user to guide the at least one user to perform the at least one task.

2. The method of claim 1, wherein the at least one user comprises two or more users and received and determined information is shared among the two or more users such that a correct position for displaying the at least one visual representation on a see-through display as an augmented overlay to the view of the two or more users is determined using information in at least one completed scene graph related to either one of the two or more users.

3. The method of claim 1, wherein 3D positional information of the objects is determined using at least one of data received from a sensor capable of capturing depth information of a scene or image-based methods, monocular image based depth estimation, multi-frame structure from motion imagery or 3d sensors.

4. The method of claim 1, wherein determining a correct position for displaying the at least one visual representation comprises:

determining an intermediate representation for the generated at least one visual representation which provides information regarding positions of objects in the at least one visual representation and spatial relationships among the objects; and comparing the determined intermediate representation of the generated at least one visual representation with the at least one intermediate representation of the at least one scene to determine how closely the objects of the visual representation align with the objects of the at least one scene.

5. The method of claim 1, wherein a task to be performed is determined by:

generating a scene understanding of the at least one captured scene based on an automated analysis of the at least one captured scene, wherein the at least one captured scene comprises a view of a user during performance of a task related to the identified at least one object in the at least one captured scene.

6. The method of claim 1, wherein the intermediate representation comprises a scene graph.

7. The method of claim 1, further comprising:

analyzing actions of the user during the performance of a step of the task by using information related to a next step of the task;

wherein, if the user has not completed the next step of the task, new visual representations are created to be generated and presented as an augmented overlay to guide the user to complete the performance of the next step of the task; and wherein, if the user has completed the next step of the task and a subsequent step of the task exists, new visual representations are created to be generated and presented as an overlay to guide the user to complete the performance of the subsequent step of the task.

8. The method of claim 1, wherein the at least one captured scene includes both video data and audio data, the video data comprising a view of the user of a real-world scene during performance of a task and the audio data comprising speech of the user during performance of the task, and wherein the steps relating to the performance of the task are further determined using at least one of the video data or the audio data.

9. An apparatus for AI-driven augmented reality mentoring and collaboration, comprising:

a processor; and a memory accessible to the processor, the memory having stored therein at least one of programs or instructions executable by the processor to configure the apparatus to:

determine semantic features of objects in at least one captured scene using a deep learning algorithm to identify the objects in the at least one scene;

determine 3D positional information of the objects in the at least one captured scene;

combine information regarding the identified objects of the at least one captured scene with respective 3D positional information to determine at least one intermediate representation of the at least one scene, which provides information regarding positions of the identified objects in the at least one captured scene and spatial relationships among the identified objects;

complete the determined at least one intermediate representation using a machine learning model trained, using a plurality of scenes having objects related to the captured scene, to identify at least objects and positions for objects in scenes to include additional objects or positional information of the objects not identifiable from the at least one captured scene;

determine at least one task to be performed and determining steps to be performed related to the identified at least one task using a knowledge database comprising data relating to respective steps to be performed for different tasks;

generate at least one visual representation relating to the determined steps to be performed for the at least one task to assist the at least one user in performing the at least one task;

determine a correct position for displaying the at least one visual representation on a see-through display as an augmented overlay to the view of the at least one user using information in the at least one completed intermediate representation; and display the at least one visual representation on the see-through display in the determined correct position as an augmented overlay to the view of the at least one user to guide the at least one user to perform the at least one task.

10. The apparatus of claim 9, wherein the at least one user comprises two or more users and received and determined information is shared among the two or more users such that a correct position for displaying the at least one visual representation on a see-through display as an augmented overlay to the view of the two or more users is determined using information in at least one completed intermediate representation.

11. The apparatus of claim 9, wherein to determine a correct position for displaying the at least one visual representation the apparatus is further configured to:

determine an intermediate representation for the generated at least one visual representation which provides information regarding positions of objects in the at least one visual representation and spatial relationships among the objects; and compare the determined intermediate representation of the generated at least one visual representation with the at least one intermediate representation of the at least one scene to determine how closely the objects of the visual representation align with the objects of the at least one scene.

12. The apparatus of claim 9, wherein a task to be performed is determined by:

generating a scene understanding of the at least one captured scene based on an automated analysis of the at least one captured scene, wherein the at least one captured scene comprises a view of a user during performance of a task related to the identified at least one object in the at least one captured scene.

13. The apparatus of claim 9, wherein the intermediate representation comprises a scene graph.

14. The apparatus of claim 9, wherein the at least one captured scene includes both video data and audio data, the video data comprising a view of the user of a real-world scene during performance of a task and the audio data comprising speech of the user during performance of the task, and wherein the steps relating to the performance of the task are further determined using at least one of the video data or the audio data.

15. A non-transitory computer readable storage medium having stored thereon instructions that when executed by a processor perform a method for AI-driven augmented reality mentoring and collaboration, the method comprising:

determining semantic features of objects in at least one captured scene using a deep learning algorithm to identify the objects in the at least one scene;

determining 3D positional information of the objects in the at least one captured scene;

combining information regarding the identified objects of the at least one captured scene with respective 3D positional information to determine at least one intermediate representation of the at least one scene, which provides information regarding positions of the identified objects in the at least one captured scene and spatial relationships among the identified objects;

completing the determined at least one intermediate representation using a machine learning model trained, using a plurality of scenes having objects related to the captured scene, to identify at least objects and positions for objects in scenes to include additional objects or positional information of the objects not identifiable from the at least one captured scene;

determining at least one task to be performed and determining steps to be performed related to the identified at least one task using a knowledge database comprising data relating to respective steps to be performed for different tasks;

generating at least one visual representation relating to the determined steps to be performed for the at least one task to assist the at least one user in performing the at least one task;

determining a correct position for displaying the at least one visual representation on a see-through display as an augmented overlay to the view of the at least one user using information in the at least one completed intermediate representation; and displaying the at least one visual representation on the see-through display in the determined correct position as an augmented overlay to the view of the at least one user to guide the at least one user to perform the at least one task.

16. The non-transitory computer readable storage medium of claim 15, wherein the at least one user comprises two or more users and received and determined information is shared among the two or more users such that a correct position for displaying the at least one visual representation on a see-through display as an augmented overlay to the view of the two or more users is determined using information in at least one completed intermediate representation.

17. The non-transitory computer readable storage medium of claim 15, wherein 3D positional information of the objects is determined using at least one of data received from a sensor capable of capturing depth information of a scene or image based methods, monocular image based depth estimation, multi-frame structure from motion imagery or 3d sensors.

18. The non-transitory computer readable storage medium of claim 15, wherein determining a correct position for displaying the at least one visual representation comprises:

determining an intermediate representation for the generated at least one visual representation which provides information regarding positions of objects in the at least one visual representation and spatial relationships among the objects; and comparing the determined intermediate representation of the generated at least one visual representation with the at least one intermediate representation of the at least one scene to determine how closely the objects of the visual representation align with the objects of the at least one scene.

19. A method for AI-driven augmented reality mentoring and collaboration for two or more users, comprising:

determining semantic features of objects in at least one captured scene associated with two or more users using a deep learning algorithm to identify the objects in the at least one captured scene;

determining 3D positional information of the objects in the at least one captured scene;

combining information regarding the identified objects of the at least one captured scene with respective 3D positional information of the objects to determine at least one intermediate representation of the at least one scene, which provides information regarding positions of the identified objects in the at least one captured scene and spatial relationships among the identified objects;

completing the determined at least one intermediate representation using a machine learning model trained, using a plurality of scenes having objects related to the captured scene, to identify at least objects and positions for objects in scenes to include additional objects or positional information of the objects not identifiable from the at least one captured scene;

determining at least one task to be performed and determining steps to be performed related to the identified at least one task using a knowledge database comprising data relating to respective steps to be performed for different tasks;

generating at least one visual representation relating to the determined steps to be performed for the at least one task to assist the at least one user in performing the at least one task;

determining a correct position for displaying the at least one visual representation on a respective see-through display of the two or more users as an augmented overlay to the view of the two or more users using information in the at least one completed intermediate representation; and displaying the at least one visual representation on the respective see-through displays in the determined correct position as an augmented overlay to the view of the two or more users to guide the two or more users to perform the at least one task, individually or in tandem.

20. The method of claim 19, wherein the two or more users each have different perspectives of a same or a different environment and wherein the method comprises;

determining respective semantic features of objects in at least one captured scene for each of the two or more users;

determining respective 3D positional information of the objects of each of the captured scenes;

combining respective information regarding the identified objects of each of the captured scenes with respective 3D positional information of the objects of each of the captured scenes to determine respective intermediate representations;

generating at least one respective visual representation relating to the determined steps to be performed for the at least one task from the perspective of each of the two or more users to assist at least one of the two or more users in performing the at least one task; and displaying the at least one respective visual representation on the respective see-through displays in the determined correct position as an augmented overlay to the view of the two or more users to guide the two or more users to perform the at least one task.

* * * * *